US012225451B2

United States Patent
Kim et al.

(10) Patent No.: US 12,225,451 B2
(45) Date of Patent: Feb. 11, 2025

(54) APPARATUS AND METHOD FOR EXTENDED SIGNAL FIELD

(71) Applicant: SAMSUNG ELECTRONICS CO., LTD., Suwon-si (KR)

(72) Inventors: Myeongjin Kim, Seongnam-si (KR); Jinmin Kim, Hwaseong-si (KR); Wookbong Lee, San Jose, CA (US); Eunsung Jeon, Seoul (KR); Chulho Chung, Yongin-si (KR); Jonghun Han, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 271 days.

(21) Appl. No.: 17/656,916

(22) Filed: Mar. 29, 2022

(65) Prior Publication Data

US 2022/0322215 A1 Oct. 6, 2022

Related U.S. Application Data

(60) Provisional application No. 63/170,079, filed on Apr. 2, 2021.

(30) Foreign Application Priority Data

Jul. 8, 2021 (KR) ........................ 10-2021-0089944

(51) Int. Cl.
*H04L 5/02* (2006.01)
*H04L 5/00* (2006.01)
(Continued)

(52) U.S. Cl.
CPC ............. *H04W 48/16* (2013.01); *H04L 5/003* (2013.01); *H04W 28/0215* (2013.01)

(58) Field of Classification Search
CPC .... H04L 5/003; H04W 28/0215; H04W 48/16
See application file for complete search history.

(56) References Cited

U.S. PATENT DOCUMENTS 10,575,249 B2 * 2/2020 Park ................... H04L 27/2603
10,856,244 B2 12/2020 Verma et al.
(Continued)

FOREIGN PATENT DOCUMENTS

KR 10-2082093 2/2020

OTHER PUBLICATIONS

Extended European Search Report dated Aug. 29, 2022 in related European Patent Application No. 22166416.2 (12 pages).
(Continued)

*Primary Examiner* — Alpus Hsu
(74) *Attorney, Agent, or Firm* — F. CHAU & ASSOCIATES, LLC

(57) ABSTRACT

A wireless communication method, by a first apparatus, includes receiving a first Physical Layer Protocol Data Unit (PPDU) from a second apparatus, extracting a first field from a first signal field included in the first PPDU, and identifying the number of symbols in the second signal field included in the first PPDU based on a value of the first field, wherein, when the first field has a first value, the identifying the number of symbols in the second signal field includes identifying that the number of symbols in the second signal field is equal to or greater than a first number.

18 Claims, 25 Drawing Sheets

(51) Int. Cl.
*H04W 28/02* (2009.01)
*H04W 48/16* (2009.01)

(56) References Cited

U.S. PATENT DOCUMENTS

| | | | |
|---|---|---|---|
| 10,862,637 B2 | 12/2020 | Suh et al. | |
| 11,102,721 B2* | 8/2021 | Park | H04W 74/002 |
| 2020/0177425 A1 | 6/2020 | Chen et al. | |
| 2020/0329526 A1 | 10/2020 | Takada | |
| 2020/0396743 A1* | 12/2020 | Park | H04W 74/04 |
| 2020/0413482 A1 | 12/2020 | Takada | |
| 2021/0028897 A1* | 1/2021 | Park | H04L 5/0094 |
| 2021/0028917 A1* | 1/2021 | Park | H04W 72/23 |
| 2021/0029774 A1* | 1/2021 | Lim | H04W 8/24 |
| 2021/0044381 A1 | 2/2021 | Xin et al. | |
| 2021/0050914 A1* | 2/2021 | Jang | H04B 7/2656 |
| 2021/0050952 A1 | 2/2021 | Noh et al. | |
| 2021/0051664 A1 | 2/2021 | Bhattacharya et al. | |
| 2021/0068197 A1 | 3/2021 | Kim et al. | |
| 2021/0111829 A1* | 4/2021 | Jia | H04L 1/001 |
| 2021/0360472 A1* | 11/2021 | Cao | H04L 27/2605 |
| 2021/0368390 A1* | 11/2021 | Kim | H04W 28/06 |
| 2022/0029872 A1* | 1/2022 | Cao | H04W 28/06 |
| 2022/0078792 A1* | 3/2022 | Jeon | H04W 72/0453 |
| 2022/0255693 A1* | 8/2022 | Lou | H04L 5/0048 |

OTHER PUBLICATIONS

Au, "Compendium of straw polls and potential changes to the specification framework document", IEEE 802.11-20/0566R87, Nov. 3, 2020, XP055927427, p. 36, 250 pages.

Zhang, "HE-SIG-A fields proposed text changes", IEEE Draft; 11-19-1581-01-00AX-HE-SIG-A-FIELDS-Proposed-Text-Changes, IEEE-SA Mentor, Piscataway, NJ, USA, vol. 802.11ax, No. 1, Sep. 16, 2019, pp. 1-5.

* cited by examiner

FIG. 5

| UL/DL | U-SIG Fields | | | | Description | | |
|---|---|---|---|---|---|---|---|
| | PPDU Type and Compression Mode | EHT PPDU Type | EHT-SIG Present? | RU Allocation Table Present? | Total Number of Users in PPDU | Note | |
| 0 (DL) | 0 | EHT MU | Yes | Yes | ≥1 | DL OFDMA (including non-MU-MIMO and MU-MIMO) |
| | 1 | EHT MU | Yes | No | 1 | SU or NDP (Not to AP, Typically "DL") |
| | 2 | EHT MU | Yes | No | ≥1 | DL MU-MIMO (non-OFDMA) |
| | 3 | — | — | — | — | Validate |
| 1 (UL) | 0 | EHT TB | No | — | ≥1 | UL OFDMA (including non-MU-MIMO and MU-MIMO) |
| | 1 | EHT MU | Yes | No | 1 | SU or NDP (To AP, i.e., "UL") |
| | 2-3 | — | — | — | — | Validate |

FIG. 6

| PPDU bandwidth | Cases | Puncturing pattern | Field value |
|---|---|---|---|
| 20 MHz | No puncturing | [1 1 1 1] | 0 |
| 40 MHz | No puncturing | [1 1 1 1] | 0 |
| 80 MHz | No puncturing | [1 1 1 1] | 0 |
| | 20 MHz puncturing | [x 1 1 1] | 1 |
| | | [1 x 1 1] | 2 |
| | | [1 1 x 1] | 3 |
| | | [1 1 1 x] | 4 |
| 160 MHz | No puncturing | [1 1 1 1 1 1 1 1] | 0 |
| | 20 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 40 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |
| 320 MHz | No puncturing | [1 1 1 1 1 1 1 1] | 0 |
| | 40 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 80 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |
| | Both 80 MHz and 40 MHz puncturing | [x x x 1 1 1 1 1] | 13 |
| | | [x x 1 x 1 1 1 1] | 14 |
| | | [x x 1 1 x 1 1 1] | 15 |
| | | [x x 1 1 1 x 1 1] | 16 |
| | | [x x 1 1 1 1 x 1] | 17 |
| | | [x x 1 1 1 1 1 x] | 18 |
| | | [x 1 1 1 1 x x] | 19 |
| | | [1 x 1 1 1 1 x x] | 20 |
| | | [1 1 x 1 1 1 x x] | 21 |
| | | [1 1 1 x 1 1 x x] | 22 |
| | | [1 1 1 1 x 1 x x] | 23 |
| | | [1 1 1 1 1 x x x] | 24 |

FIG. 8C

| B0 | B3 B4 | B5 B6 | B8 B9 | B12 B13 B14 | B15 B16 | B19 B20 | B25 |
|---|---|---|---|---|---|---|---|
| Spatial Reuse | GI+LTF Size | Number of EHT-LTF Symbols | NSS | BF | Disregard | CRC | Tail |

FIG. 9A

| B0 | B19 B20 | B41 B42 B45 B46 | B51 |
|---|---|---|---|
| Common field for non-OFDMA transmission to a single user and DL non-OFDMA transmission to multiple users | User field | CRC | Tail |

FIG. 10A

| STA-ID | MCS | R | NSTS | BF | C |
|---|---|---|---|---|---|
| B0 — B10 | B11 — B14 | B15 — B16 | | B19 — B20 | B21 |

FIG. 10B

| STA-ID | MCS | C | Spatial Configuration |
|---|---|---|---|
| B0 — B10 | B11 — B14 | B15 — B16 | — B21 |

FIG. 18

| Number Of EHT-SIG Symbols field in U-SIG (5 bits) | Number Of EHT-SIG Symbols Extension field in EHT-SIG (n bits) | Number of OFDM symbols in EHT-SIG |
|---|---|---|
| 0 | 0 | 1 |
| 1 | 0 | 2 |
| 2 | 0 | 3 |
| 3 | 0 | 4 |
| 4 | 0 | 5 |
| ... | ... | ... |
| 31 | 0 | 32 |
| 0 | 1 | 33 |
| 1 | 1 | 34 |
| 2 | 1 | 35 |
| 3 | 1 | 36 |
| 4 | 1 | 37 |
| ... | ... | ... |
| 31 | 1 | 64 |
| 0 | 2 | 65 |
| 1 | 2 | 66 |
| 2 | 2 | 67 |
| 3 | 2 | 68 |
| 4 | 2 | 69 |
| ... | ... | ... |
| 31 | 2 | 96 |
| ... | ... | ... |

APPARATUS AND METHOD FOR EXTENDED SIGNAL FIELD

CROSS-REFERENCE TO RELATED APPLICATIONS

This application is based on and claims priority under 35 U.S.C. § 119 to Korean Patent Application No. 10-2021-0089944, filed on Jul. 8, 2021, in the Korean Intellectual Property Office, and U.S. Patent Application No. 63/170,079, filed on Apr. 2, 2021, the disclosures of which are incorporated by reference herein in their entireties.

BACKGROUND

The present disclosure relates to wireless communication, and more particularly, to an apparatus and a method of an extended signal field.

As an example of wireless communication, a Wireless Local Area Network (WLAN) is technology for connecting two or more apparatuses to each other using wireless signal transmission. WLAN technology may be based on Institute of Electrical and Electronics Engineers (IEEE) 802.11 standards. The 802.11 standards have developed into 802.11b, 802.11a, 802.11g, 802.11n, 802.11ac, and 802.11ax versions, and may support a transmission rate up to 1 Gbyte/s based on Orthogonal Frequency-Division Multiplexing (OFDM) and other wireless communication technologies.

According to some wireless technology standards such as 802.11ac, data may be simultaneously transmitted to multiple users through a multi-user multi-input multi-output (MU-MIMO) technique. According to some wireless technology standards such as 802.11ax, referred to as High Efficiency (HE), the MU-MIMO technique as well as an Orthogonal Frequency-Division Multiple Access (OFDMA) technique are applied, and thus, multiple access may be realized by dividing available subcarriers and providing the divided subcarriers to users. Accordingly, WLAN systems may effectively support communication in congested areas and outdoor space.

According to some wireless technology standards such as 802.11be, referred to as Extremely High Throughput (EHT), a 6-GHz unlicensed spectrum support, bandwidth utilization up to 320 MHz per channel, Hybrid Automatic Repeat and Request (HARQ) introduction, support for up to 16×16 MIMO, etc., are planned. To this end, next-generation WLAN systems support low latency and high-speed transmission.

SUMMARY

The present disclosure provides an apparatus and a method of accurately and effectively transmitting the number of symbols in an extended signal field.

According to an aspect of the present disclosure, there is provided a wireless communication method by a first apparatus, the wireless communication method including receiving a first Physical Layer Protocol Data Unit (PPDU) from a second apparatus, extracting a first field from a first signal field included in the first PPDU, and identifying a number of symbols in a second signal field in the first PPDU, based on a value of the first field, wherein the identifying the number of symbols in the second signal field comprises identifying that the number of symbols in the second signal field is equal to or greater than a first number when the first field has a first value.

According to an aspect of the present disclosure, there is provided a wireless communication method by a first apparatus, the wireless communication method including receiving a first PPDU from a second apparatus, extracting a first field from a first signal field in the first PPDU, extracting a first subfield from a second signal field included in the first PPDU, and identifying a number of symbols in the second signal field based on a value of the first field and a value of the first subfield.

According to an aspect of the present disclosure, there is provided a wireless communication method by a first apparatus, the wireless communication method including receiving a first PPDU from a second apparatus, extracting a first field, a second field, and a third field from a first signal field in the first PPDU, identifying a mode of the first PPDU based on a value of the first field, identifying a puncturing pattern based on a value of the second field, and identifying a number of symbols in a second signal field included in the first PPDU, wherein the identifying the number of symbols in the second signal field comprises identifying the number of symbols in the second signal field based on at least one bit of the second field and the third field when the identified mode is a first mode.

BRIEF DESCRIPTION OF THE DRAWINGS

Embodiments of the present disclosure will be more clearly understood from the following detailed description taken in conjunction with the accompanying drawings in which:

FIG. 5 shows encoding of a PPDU type and compression mode field, according to an example embodiment;

FIG. 6 shows encoding of a punctured channel information field, according to an example embodiment;

FIGS. 8A to 8C are diagrams of examples of common fields according to example embodiments;

FIGS. 9A and 9B are diagrams of examples of a block including a user field, according to example embodiments;

FIGS. 10A and 10B are diagrams of examples of a user field according to example embodiments;

FIG. 18 shows encoding of an EHT-SIG symbol number field and an EHT-SIG symbol number extension field, according to an example embodiment;

DETAILED DESCRIPTION OF THE EMBODIMENTS

The present disclosure relates to systems and methods of wireless communication. Embodiments of the disclosure relate to the 802.11 wireless communication standard. In 802.11be, referred to as an Extremely High Throughput (EHT), a Physical Layer Protocol Data Unit (PPDU) includes a U-SIG field and an EHT-SIG field. The U-SIG field may include a number of EHT-SIG symbols field having 5 bits and indicating the number of symbols in the EHT-SIG field. Unlike a U-SIG field having a fixed length (or the number of bits), the EHT-SIG field may have a variable length and may correspond to symbols that are greater than 32 according to a mode and the number of users. Because the number of EHT-SIG symbols field may indicate a maximum of 32 symbols, there is a need for a method of accurately indicating the number of symbols in an EHT-SIG field.

According to the present disclosure, several methods may be used to indicate a number of symbols in EHT-SIG field that is greater than 32. In an embodiment, when a value of the number of EHT-SIG symbols field is equal to 31, a station (STA) may identify the number of symbols that is equal to or greater than 32. The STA may identify the number of user fields based on information included in a common field in the EHT-SIG field and identify the number of symbols in the EHT-SIG field based on the number of user fields. In an embodiment, the EHT-SIG field may include an extension field of the number of EHT-SIG symbols field, and the STA may identify the number of symbols in the EHT-SIG field based on values of the number of EHT-SIG symbols field and the extension field. In an embodiment, one bit of a punctured channel information field, which is not used in OFDMA, may be used as the extension field of the number of EHT-SIG symbols field. In an embodiment, an existing longer than 16 HE-SIG-B OFDM symbols support subfield of a HE PHY capabilities information field or a new longer-than-32 EHT-SIG OFDM symbols support subfield of an EHT PHY capabilities information field may be used to deliver, to an AP, whether the STA may support the symbols in the EHT-SIG field that are greater than 32.

Accordingly, embodiments of the present disclosure include at least a first method of sharing the number of symbols in the EHT-SIG field as described above and at least a second method of sharing whether it is possible to support the symbols in the EHT-SIG field that are greater than 32.

Figure 1:
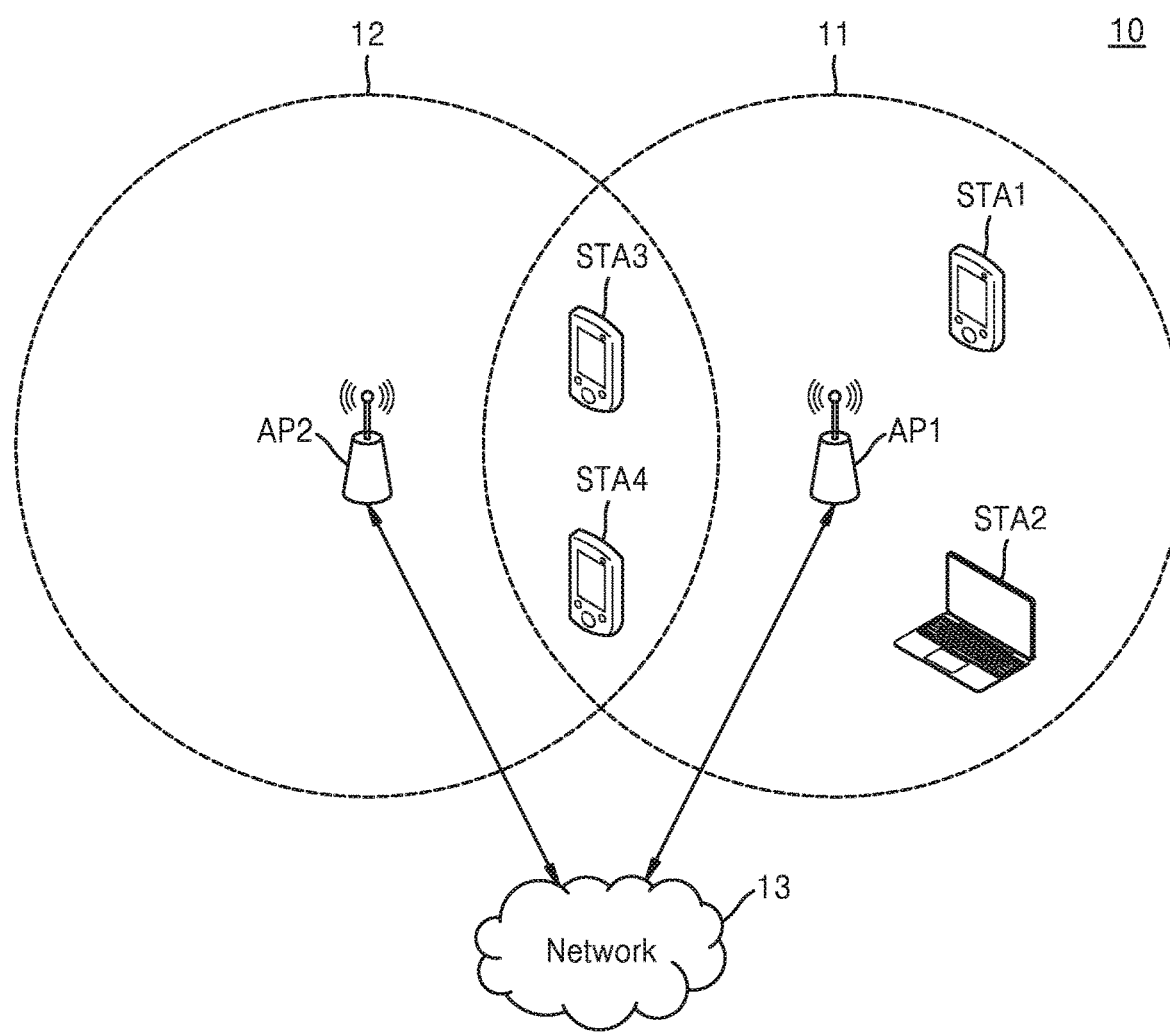
FIG. 1 is a diagram of a wireless communication system according to an example embodiment.

FIG. 1 is a diagram of a wireless communication system 10 according to an example embodiment. In detail, FIG. 1 illustrates a Wireless Local Area Network (WLAN) system as an example of the wireless communication system 10.

According to at least one embodiment, a wireless communication system based on Orthogonal Frequency-Division Multiplexing (OFDM) or Orthogonal Frequency-Division Multiple Access (OFDMA), in particular, IEEE 802.11 standards, is described. However, the inventive concept is applicable, with minor modifications, to other communication systems (e.g., a cellular communication system such as Long Term Evolution (LTE), LTE-advanced (LTE-A), New Radio (NR), Wireless Broadband (WiBro) or Global System for Mobile Communication (GSM) or a short-range communication system such as Bluetooth or Near Field Communication (NFC)) which have similar technical backgrounds and channel forms to those of the inventive concept without departing from the scope of the inventive concept significantly, and one of ordinary skill in the art can make such modifications.

Also, various functions described below may be embodied or supported according to Artificial Intelligence (AI) technology or at least one computer program, and each of the at least one computer program is implemented as computer-readable program code and executed in a computer-readable medium. The terms "application" and "program" indicate one or more computer programs, software components, a set of instructions, procedures, functions, objects, classes, instances, relevant data, or some of the applications and programs appropriate to realize computer-readable program code. The expression "computer-readable program code" includes all types of computer code including source code, object code, and execution code. The expression "computer-readable medium" includes all types of media, for example, Read Only Memory (ROM), Random Access Memory (RAM), a hard disk drive, compact disks (CDs), digital video disks (DVDs), or other types of memory, which are accessible by a computer. A "non-transitory" computer-readable recording medium excludes wired, wireless, optical, or other communication links used to transmit transitory electrical or other signals. Examples of the non-transitory computer-readable recording medium include a medium in which data may be permanently stored, and a medium, for example, a rewriteable optical disk or a removable memory device, in which data may be stored and overwritten later.

In one or more embodiments described below, a hardware approach method is described. However, various embodiments include technology using both hardware and software, and thus, the embodiments of the inventive concept do not exclude a software-based approach method.

Also, the terms indicating control information, entries, network entities, messages, and components of an apparatus are used for the convenience of explanation. Therefore, the inventive concept is not limited to the terms described below, and other terms having the same technical meanings may be used.

Referring to FIG. 1, the wireless communication system 10 may include first and second access points AP1 and AP2, a first station STA1, a second station STA2, a third station STA3, and a fourth station STA4. The first and second access points AP1 and AP2 may access a network 13 including the Internet, an Internet protocol (IP) network, or another arbitrary network. The first access point AP1 may provide access to the network 13 to the first to fourth stations STA1 to STA4 in a first coverage area 11, and the second access point AP2 may also provide access to the network 13 to the third and fourth stations STA3 and STA4 in a second coverage area 12. In some embodiments, the first and second access points AP1 and AP2 may communicate with at least one of the first to fourth stations STA1 to STA4, based on Wireless Fidelity (Wi-Fi) or other arbitrary WLAN access technologies.

An access point may be referred to as a router, a gateway, or the like, and a station may be referred to as a mobile station, a subscriber station, a terminal, a mobile terminal, a wireless terminal, user equipment, a user, or the like. The station may be a mobile apparatus such as a mobile phone, a laptop computer, or a wearable apparatus or may be a stationary apparatus such as a desktop computer, or a smart television (TV). Herein, the station may be referred to as a first apparatus, and the access point may be referred to as a second apparatus. Examples of the access point and the station will be described below with reference to FIG. 24.

The access point may allocate at least one resource unit (RU) to at least one station. The access point may transmit data through the allocated RU, and at least one station may receive the data through the allocated RU. In 802.11ax (hereinafter, referred to as HE), an access point may allocate a single RU to at least one station, but in 802.11be (hereinafter, referred to as EHT) or next-generation IEEE 802.11 standards (hereinafter, referred to as EHT+), an access point may allocate a Multi-Resource Unit (MRU) including two or more RUs to at least one station. For example, the first access point AP1 may allocate an MRU to at least one of the first to fourth stations STA1 to STA4 and may transmit data through the allocated MRU.

In some embodiments, the access point (or the station) may transmit an extended signal field to the station (or the access point). For example, as described below with reference to FIG. 3, an Extremely High Throughput-Signal (EHT-SIG) field among signal fields included in an EHT MU (multi-user) Physical Layer Protocol Data Unit (PPDU) may have a variable length according to the number of stations (or users), and accordingly, the number of symbols in the EHT-SIG field may vary. The number of symbols in the EHT-SIG field may be identified at a receiving side based on a value included in a Universal Signal (U-SIG) field prior to the EHT-SIG field, but there may be a limitation on the indication of the number of symbols in the EHT-SIG field due to the length of the field having the value. For example, as described below with reference to FIG. 4, the U-SIG may include a 5-bit EHT-SIG symbol number field indicating a number of symbols that is between 1 and 32. However, in some cases the EHT-SIG symbol number field may not indicate a number of symbols in an extended signal field, for example, the number of symbols in the EHT-SIG, which is greater than 32.

Accordingly, as described below with reference to the attached drawings, the number of symbols in the extended signal field may be accurately identified at the receiving side. Thus, the reception or transmission of the extended signal field may be enabled, and the efficiency of a wireless communication system may be improved accordingly. Also, due to the number of signal field symbols being accurately identified, the decoding may be effectively performed at the receiving side. Hereinafter, one or more embodiments of the inventive concept will be described by referring to EHT, but example embodiments of the inventive concept may be applied to other protocol standards, for example, EHT+ or other wireless communication standards.

Figure 2:
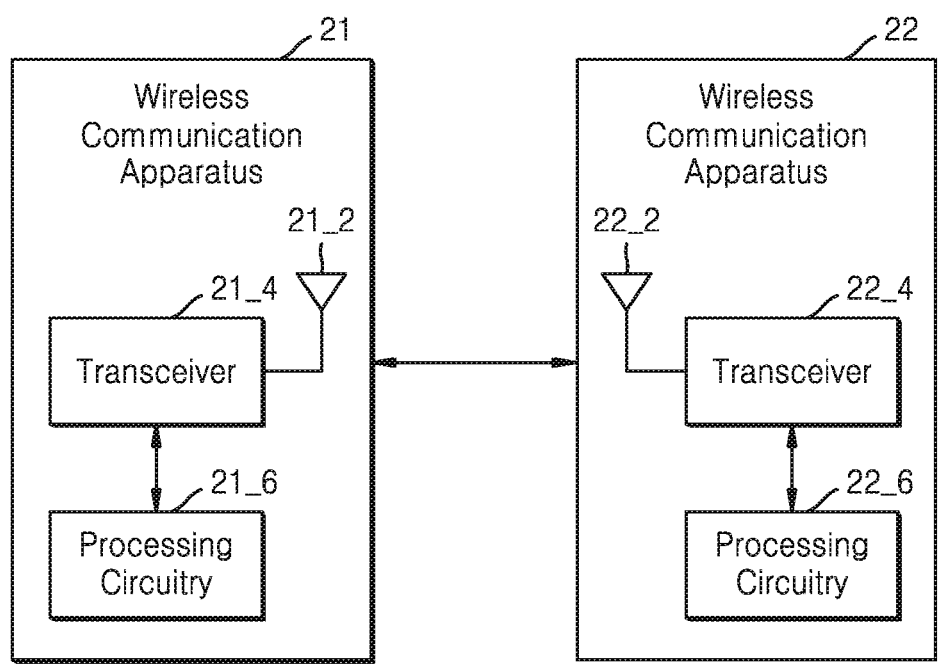
FIG. 2 is a block diagram of a wireless communication system according to an example embodiment.

FIG. 2 is a block diagram of a wireless communication system 20 according to an example embodiment. In detail, the block diagram of FIG. 2 illustrates a first wireless communication apparatus 21 and a second wireless communication apparatus 22 that communicate with each other in the wireless communication system 20. Each of the first wireless communication apparatus 21 and the second wireless communication apparatus 22 of FIG. 2 may be an arbitrary apparatus that communicates in the wireless communication system 20 and may be referred to as apparatus for wireless communication. In some embodiments, each of the first wireless communication apparatus 21 and the second wireless communication apparatus 22 may be an access point or a station of a WLAN system.

Referring to FIG. 2, the first wireless communication apparatus 21 may include an antenna 21_2, a transceiver 21_4, and processing circuitry 21_6. In some embodiments, the antenna 21_2, the transceiver 21_4, and the processing circuitry 21_6 may be included in one package or different packages. The second wireless communication apparatus 22 may also include an antenna 22_2, a transceiver 22_4, and processing circuitry 22_6. Hereinafter, repeated descriptions regarding the first wireless communication apparatus 21 and the second wireless communication apparatus 22 are omitted.

The antenna 21_2 may receive a signal from the second wireless communication apparatus 22 and provide the received signal to the transceiver 21_4, or may transmit a signal from the transceiver 21_4 to the second wireless communication apparatus 22. In some embodiments, the antenna 21_2 may include a plurality of antennas for multiple input multiple output (MIMO). In some embodiments, the antenna 21_2 may also include a phased array for beamforming.

The transceiver 21_4 may process the signal transmitted through the antenna 21_2 from the second wireless communication apparatus 22 and may provide the processed signal to the processing circuitry 21_6. Also, the transceiver 21_4 may process a signal provided from the processing circuitry 21_6 and may output the processed signal through the antenna 21_2. In some embodiments, the transceiver 21_4 may include an analog circuit such as a low noise amplifier, a mixer, a filter, a power amplifier, or an oscillator. In some embodiments, the transceiver 21_4 may process the signal transmitted through the antenna 21_2 and/or the signal transmitted from the processing circuitry 21_6, according to the control of the processing circuitry 21_6.

The processing circuitry 21_6 may extract information received by the second wireless communication apparatus 22 by processing the signal transmitted from the transceiver 21_4. For example, the processing circuitry 21_6 may extract the information through demodulation and/or decoding of the signal transmitted from the transceiver 21_4. Also, the processing circuitry 21_6 may generate a signal, which includes information to be transmitted to the second wireless communication apparatus 22, and provide the generated signal to the transceiver 21_4. For example, the processing circuitry 21_6 may provide the transceiver 21_4 with a signal generated through encoding and/or modulation of data to be transmitted to the second wireless communication apparatus 22. In some embodiments, the processing circuitry 21_6 may include a programmable component such as a Central Processing Unit (CPU) or a Digital Signal Processor (DSP), a reconfigurable component such as a Field Programmable Gate Array (FPGA), or a component, for example, an Intellectual Property core (IP core), which provides a designated function. In some embodiments, the processing circuitry 21_6 may include a memory configured to store data and/or a series of instructions or may access the memory.

Herein, performing operations by the transceiver 21_4 and/or the processing circuitry 21_6 may be simply referred to as performing operations by the first wireless communication apparatus 21. Accordingly, operations performed by an access point may be performed by a transceiver and/or processing circuitry included in the access point, and operations performed by a station may be performed by a transceiver and/or processing circuitry included in the station.

Figure 3:
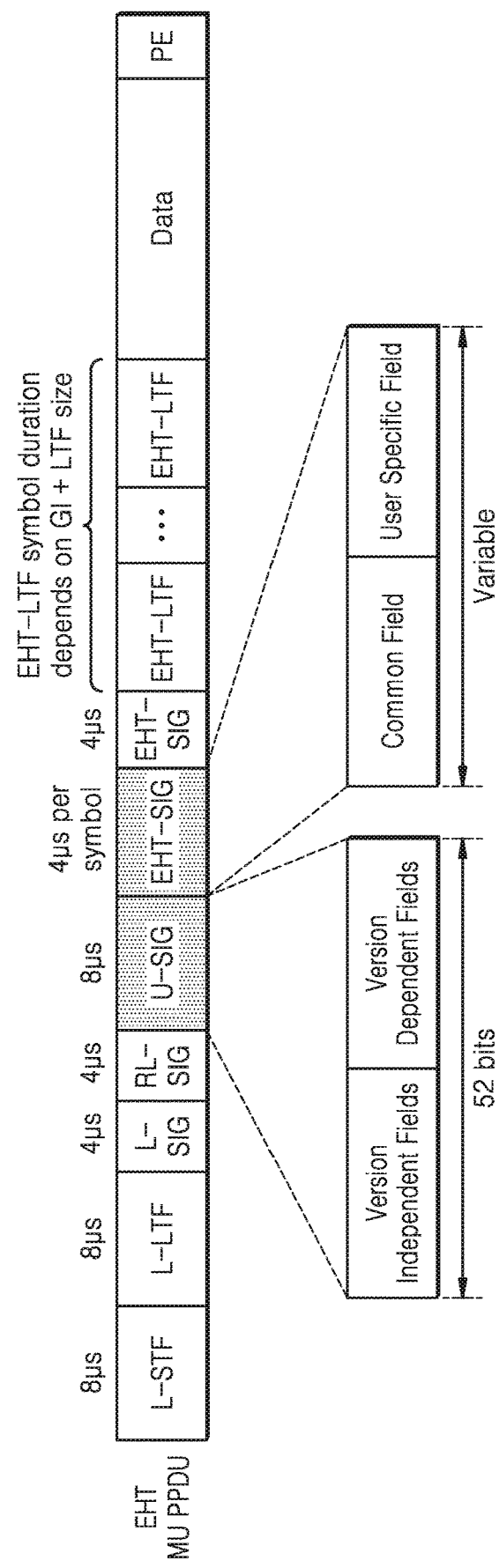
FIG. 3 is a diagram of a Physical Layer Protocol Data Unit (PPDU) according to an example embodiment.

FIG. 3 is a diagram of a PPDU according to an example embodiment. In detail, FIG. 3 illustrates a structure of an EHT MU PPDU. High efficiency (HE) may define an HE MU PPDU and an HE single user (SU) PPDU, but an EHT may not define the EHT SU PPDU and transmit the EHT MU PPDU to a single user. The EHT MU PPDU may be set in a compressed mode or a non-compressed mode and may include OFDM symbols in the non-compressed mode.

Referring to FIG. 3, the EHT MU PPDU may include a preamble including training fields and signaling fields and a payload including a data field. In the preamble, the EHT MU PPDU may include a Legacy-Short Training Field (L-STF), a Legacy-Long Training Field (L-LTF), a Legacy-Signal (L-SIG) field, a Repeated Legacy-Signal (RL-SIG) field, a U-SIG field, an EHT-SIG field, an Extremely High Throughput-Short Training Field (EHT-STF) and an Extremely High Throughput-Long Training Field (EHT-LTF). Also, the EHT MU PPDU may include a data field and a Packet Extension (PE) field in the payload. Herein, the U-SIG field and the EHT-SIG field may be simply referred to as a U-SIG and an EHT-SIG.

The L-STF may include a short training OFDM symbol and may be used for frame detection, Automatic Gain Control (AGC), diversity detection, and coarse frequency/time synchronization. The L-LTF may include a long training OFDM symbol and may be used for fine frequency/time synchronization and channel estimation. The L-SIG field may be used to transmit control information and may include information regarding a data rate and a data length. In some embodiments, the L-SIG field may be repeated in the RL-SIG field.

The U-SIG field (or the U-SIG) may include control information that is common to at least one station receiving the EHT MU PPDU, and may correspond to HE-SIG-A of the HE. For example, as illustrated in FIG. 3, the U-SIG field may include version-independent fields and version-dependent fields. In some embodiments, the U-SIG field may further include fields that respectively correspond to cyclic redundancy check (CRC), a tail, and reserved bits. The version-independent fields may include static locations and bit definition in different generations and/or physical versions. In some embodiments, differently from the EHT-SIG field described below, the U-SIG field may be modulated according to a single modulation method, for example, Binary Phase-Shift Keying (BPSK). An example of the U-SIG field will be described below with reference to FIG. 4.

The EHT-SIG field may have a variable MCS and length and may correspond to HE-SIG-B of the HE. For example, as illustrated in FIG. 3, when the EHT MU PPDU is transmitted to multiple users, the EHT-SIG field may include a common field including common control information and a user specific field including control information dependent on a user. As illustrated in FIG. 3, the U-SIG field may have a fixed length (e.g., 8 μs), but the EHT-SIG field may have a variable length. The common field may include a U-SIG overflow, the total number of non-OFDMA users, and an RU allocation subfield (RUA). A user specific field for the non-MU MIMO may include an STA-ID subfield, an MCS subfield, an $N_{STS}$ subfield, a Beamformed subfield, and a coding subfield, and a user specific field for the MU-MIMO may include an STA-ID subfield, an MCS subfield, a coding subfield, and a spatial configuration subfield. In some embodiments, the EHT-SIG field may be modulated according to one of two or more modulation methods such as BPSK and Quadrature Binary Phase Shift Keying (QBPSK).

Figure 4:
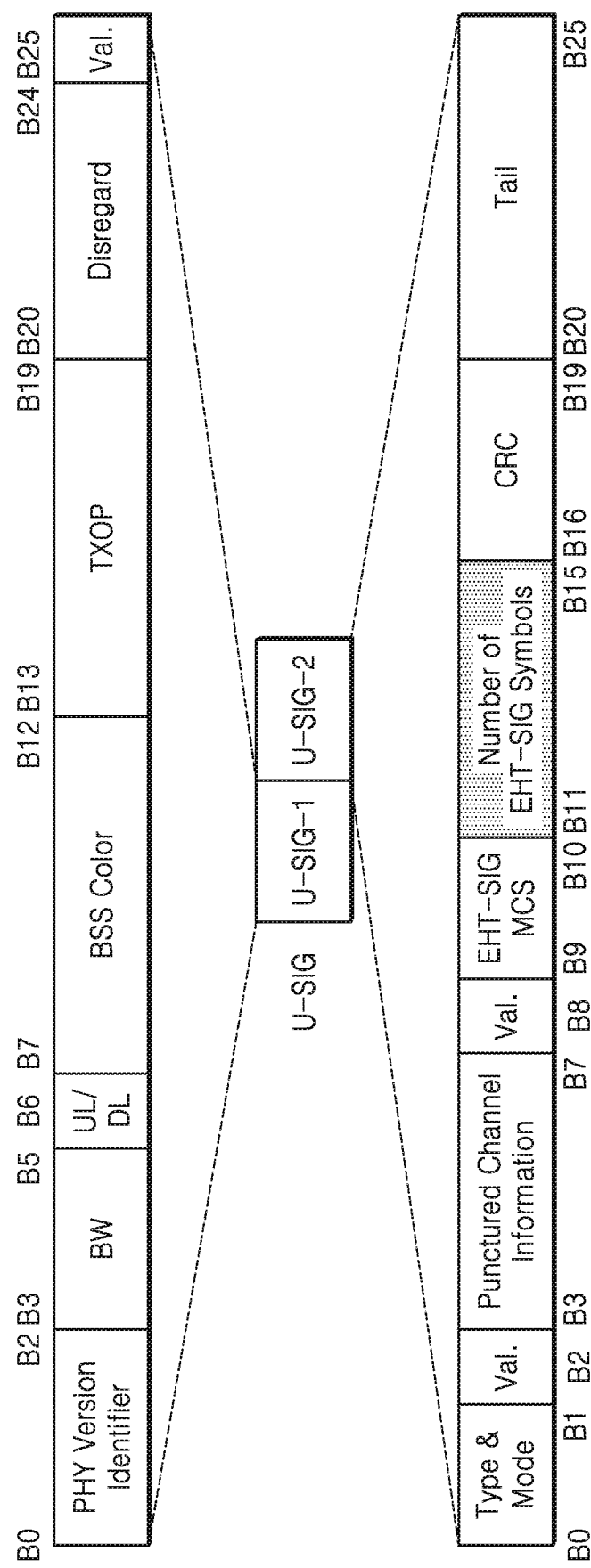
FIG. 4 is a diagram of a Universal Signal (U-SIG) field according to an example embodiment.

FIG. 4 is a diagram of a U-SIG field according to an example embodiment. In detail, FIG. 4 illustrates a U-SIG field included in the EHT MU PPDU, and as described above with reference to FIG. 3, the U-SIG field may be followed by the EHT-SIG field.

Referring to FIG. 4, the U-SIG field may include U-SIG-1 and U-SIG-2. The U-SIG-1 and the U-SIG-2 may respectively correspond to two OFDM symbols, and as illustrated in FIG. 4, the U-SIG-1 and the U-SIG-2 may respectively correspond to 26 bits. The U-SIG-1 may include version-independent fields, such as a 3-bit physical version identifier field, a 3-bit bandwidth (BW) field, a 1-bit UL/DL field, a 6-bit BSS color field, a 7-bit TXOP field, and a 1-bit validate field. Also, the U-SIG-2 may be version-dependent fields, such as a 2-bit PPDU type and compression mode field, a 5-bit punctured channel information field, a 2-bit EHT-SIG MCS field, a 5-bit EHT-SIG symbol number field, a 4-bit CRC field, and a 6-bit tail field. The PPDU type and compression mode field will be described below with reference to FIG. 5, and the punctured channel information field will be described below with reference to FIG. 6.

Among the fields included in the U-SIG-2, the EHT-SIG symbol number field may have a value indicating the number of symbols in the EHT-SIG field after the U-SIG field. As illustrated in FIG. 4, for example, when the EHT-SIG symbol number field has 5 bits, a value of the EHT-SIG symbol number field may be one of 1 to 32. However, the EHT-SIG field may include more than 32 symbols. For example, in a bandwidth of 320 MHz, the EHT-SIG field may include eight RU allocation subfields, and each of the RU allocation subfields may indicate nine users (that is, nine stations). Accordingly, the user specific field of the EHT-SIG field may include 72 user fields, and more than 32 symbols may be used for the EHT-SIG field having hundreds of bits. Hereinafter, examples for indicating the number of symbols that is greater than the number defined by the EHT-SIG symbol number field will be described.

FIG. 5 shows encoding of a PPDU type and compression mode field, according to an example embodiment. In detail, the table of FIG. 5 shows a UL/DL field included in U-SIG1 of a U-SIG field together with a PPDU type and compression mode field included in U-SIG2 of the U-SIG field. As described above with reference to FIG. 4, the UL/DL field may have a 1-bit length, and the PPDU type and compression mode field may have a 2-bit length.

Referring to FIG. 5, the UL/DL field may indicate an uplink or a downlink, and the PPDU type and compression mode field may indicate which mode the PPDU supports. As shown in FIG. 5, when the value of the PPDU type and compression mode field is 0, the PPDU may be based on OFDMA. Also, when the value of the PPDU type and compression mode field is 1, the PPDU may be configured for an SU or a null data packet (NDP). Also, when the value of the PPDU type and compression mode field is 2 in the downlink, the PPDU may be configured for MU MIMO based on non-OFDMA. That is, when the value of the PPDU type and compression mode field is 0, the PPDU may be based on OFDMA, and when the PPDU type and compression mode field has a value other than 0, the PPDU may be based on OFDM. As described below with reference to FIG. 19, etc., at least one bit of the punctured channel information field may not be used according to the value of the PPDU type and compression mode field.

FIG. 6 shows encoding of a punctured channel information field according to an example embodiment. In detail, the table of FIG. 6 shows puncturing patterns indicated by the punctured channel information field in non-OFDMA. As described above with reference to FIG. 4, the punctured channel information field may be included in the U-SIG-2 of the U-SIG field and may have a 5-bit length.

Referring to FIG. 6, puncturing may not be performed in bandwidths of 20 MHz and 40 MHz, and a value of the punctured channel information field may be 0. The value of the punctured channel information field in a bandwidth of 80 MHz may be a number from 1 to 4, the value of the punctured channel information field in a bandwidth of 160 MHz may be a number from 0 to 12 according to a puncturing pattern, and the value of the punctured channel information field in a bandwidth of 320 MHz may be a number from 0 to 24 according to puncturing patterns. As a result, the punctured channel information field in the non-OFDMA may have a value between 0 and 24, and all 5 bits of the punctured channel information field may be used to indicate the puncturing patterns. Unlike the table of FIG. 6, 4 bits respectively indicating 20 MHz frequency subblocks may be used among the 5 bits of the punctured channel information field, and the other bit may not be used in OFDMA.

Figure 7A:
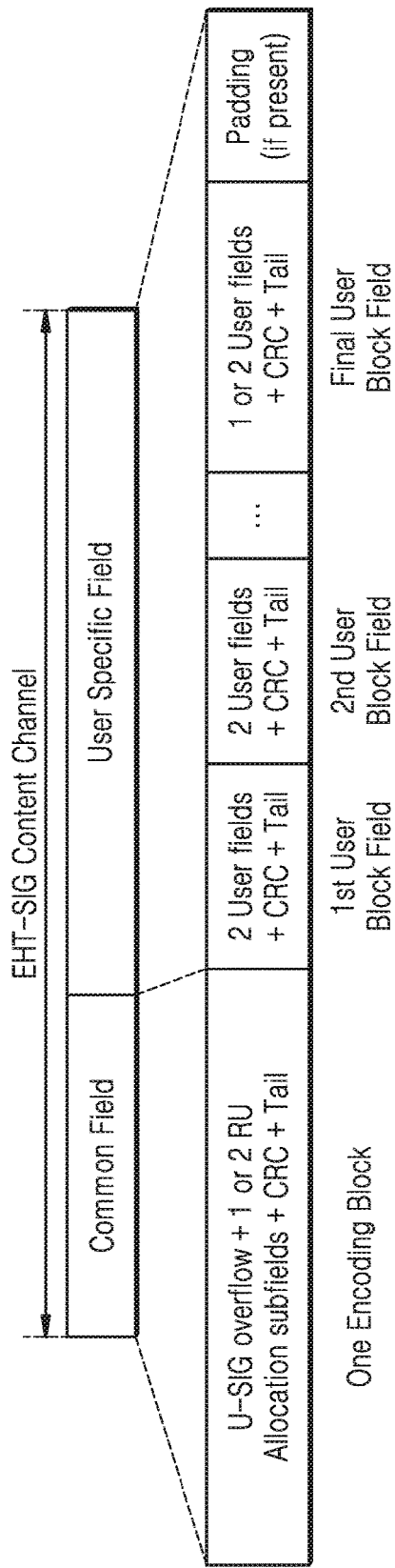
FIGS. 7A to 7F are diagrams of examples of Extremely High Throughput-Signal (EHT-SIG) content channels, according to example embodiments.
Figure 7B:
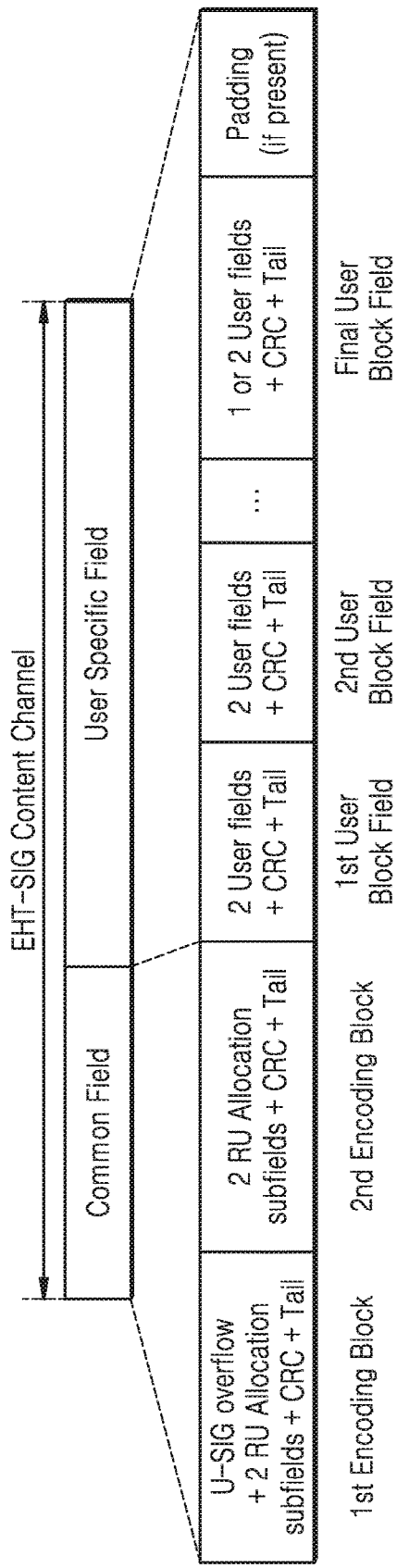
Figure 7C:
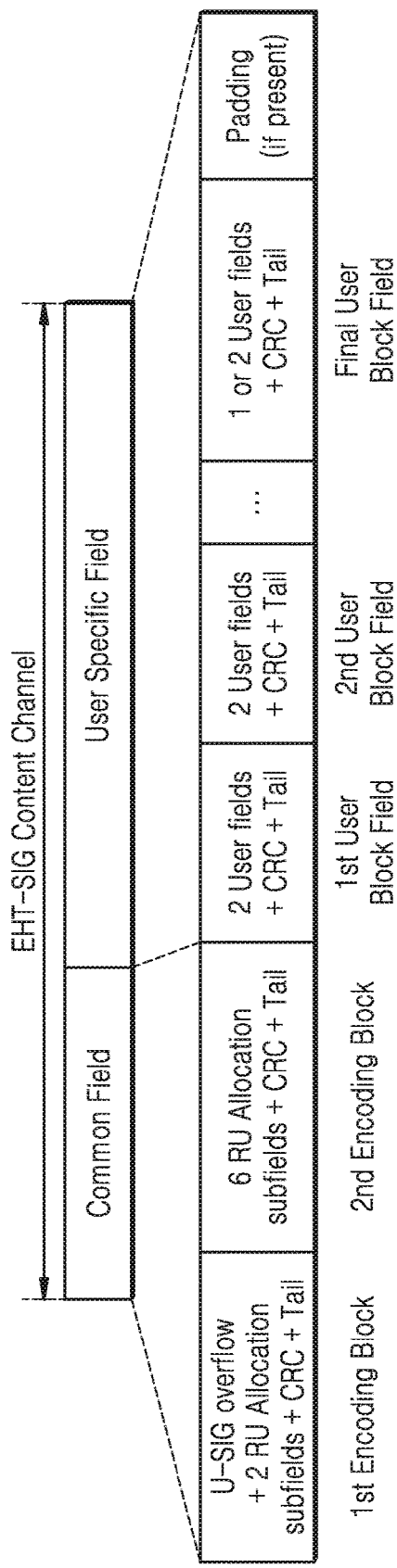
Figure 7D:
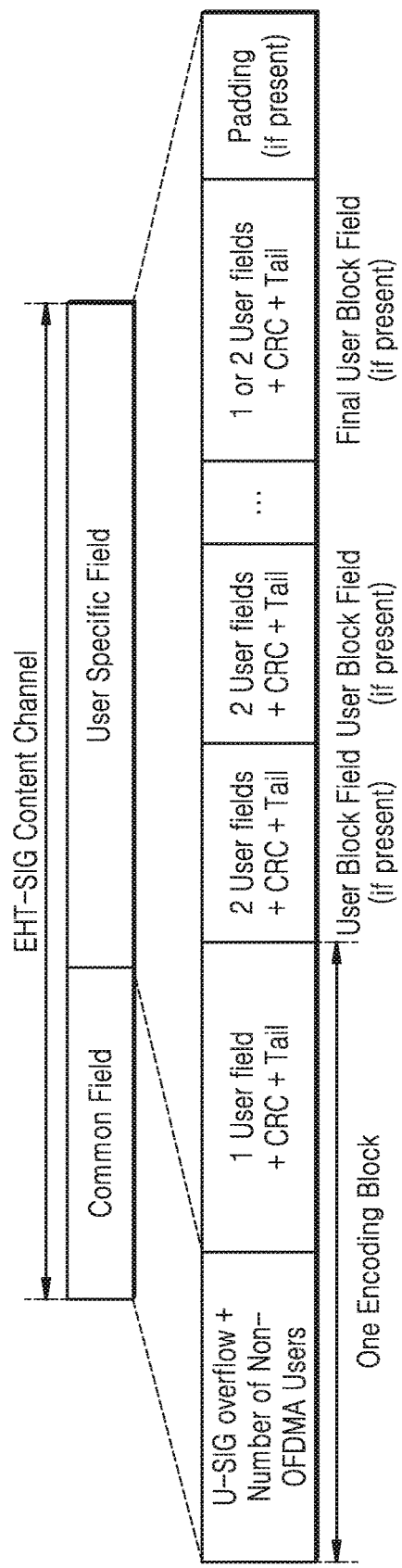
Figure 7E:
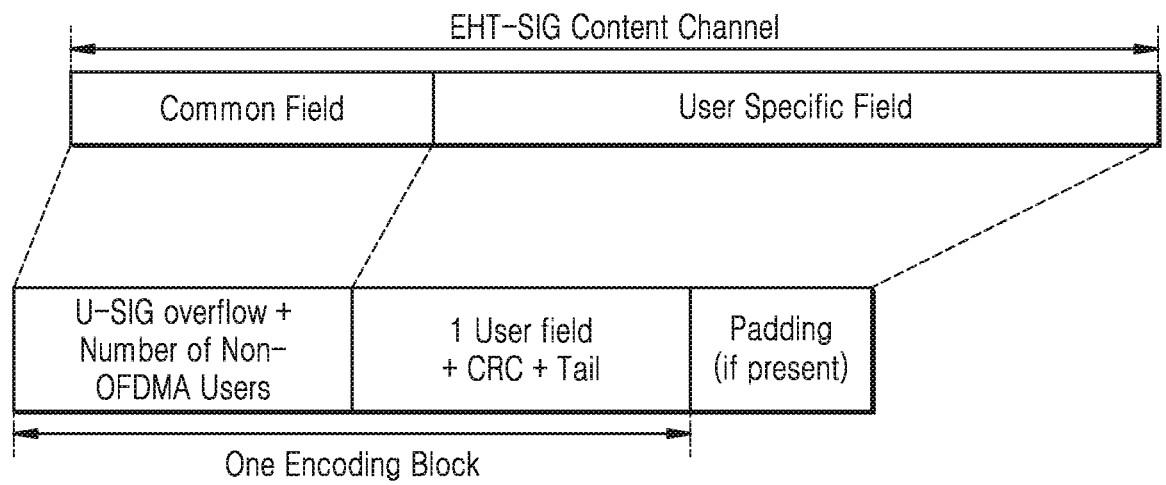
Figure 7F:
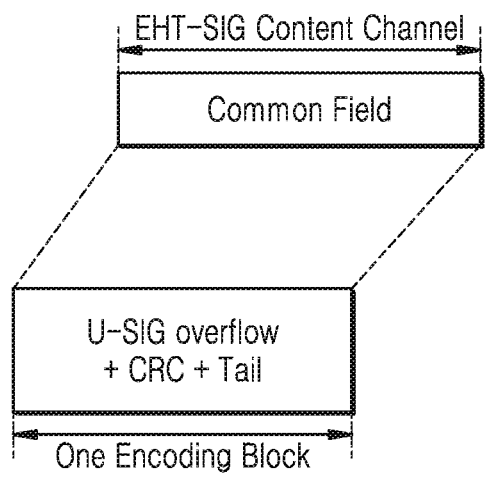

FIGS. 7A to 7F are diagrams of examples of EHT-SIG content channels according to example embodiments. In detail, FIG. 7A illustrates an EHT-SIG content channel format for the OFDMA transmission in a bandwidth of 20 MHz, 40 MHz, or 80 MHz, FIG. 7B illustrates an EHT-SIG content channel format for the OFDMA transmission in a bandwidth of 160 MHz, and FIG. 7C illustrates an EHT-SIG content channel format for the OFDMA transmission in a bandwidth of 320 MHz. FIG. 7D illustrates an EHT-SIG content channel format for the OFDMA transmission to multiple users, FIG. 7E illustrates an EHT-SIG content channel format for the non-OFDMA transmission to a single user, and FIG. 7F illustrates an EHT-SIG content channel format for an EHT sounding NDP.

The EHT-SIG field may include information that enable stations to decode the EHT MU PPDU along with the U-SIG field. For example, in the EHT MU PPDU, the EHT-SIG field may include U-SIG overflow bits that are information commonly applied to all stations. Also, the EHT-SIG field may include resource allocation information that a user uses to decode data by using an RU or an MRU allocated to the user. The EHT-SIG field for the EHT MU PPDU may have one EHT-SIG content channel in the bandwidth of 20 MHz, the EHT-SIG field for the EHT MU PPDU may have two EHT-SIG content channels in the bandwidth of 40 MHz or 80 MHz, and the EHT-SIG field for the EHT MU PPDU may have two EHT-SIG content channels in every 80 MHz frequency subblock in the bandwidth of 160 MHz or 320 MHz. Examples of the EHT-SIG content channels according to the bandwidths will be described below with reference to FIGS. 11A to 11D and 12A to 12D.

As described above with reference to FIG. 5, the EHT-SIG field may have different structures depending on modes defined according to values of the UL/DL field of the U-SIG field and the PPDU type and compression mode field, for example, the DL OFDMA transmission, the DL non-OFDMA transmission to multiple users, the non-OFDMA transmission to a single user, or the EHT sounding NDP.

Referring to FIGS. 7A to 7C, when the value of the UL/DL field is 0 and the value of the PPDU type and compression mode field is 0, a PPDU for DL OFDMA transmission may be defined. When the bandwidth of the PPDU is equal to or greater than 40 MHz in the DL OFDMA transmission, user fields may be split across content channels according to the common field in each EHT-SIG content channel, and this split may be referred to as a dynamic split.

Referring to FIG. 7D, when the value of the UL/DL field is 0 and the value of the PPDU type and compression mode field is 2, a PPDU for the DL non-OFDMA transmission to multiple users may be defined. When the bandwidth of the PPDU is equal to or greater than 40 MHz in the DL non-OFDMA transmission to multiple users, the user fields may be split across the EHT-SIG content channels, and this split may be referred to as an equitable split.

Referring to FIG. 7E, when the value of the UL/DL field is 0 or 1 and the value of the PPDU type and compression mode field is 1, a PPDU for the non-OFDMA transmission to a single user may be defined. When the bandwidth of the PPDU is equal to or greater than 40 MHz in the non-OFDMA transmission to a single user, the user field may only be repeated across the EHT-SIG content channels. The common field and one user field may be encoded into one block in FIGS. 7A to 7E, and one encoding block will be described below with reference to FIG. 9A.

Referring to FIG. 7F, when the value of the UL/DL field is 0 or 1 and the value of the PPDU type and compression mode field is 1, a PPDU for the EHT sounding NDP may be defined. In the EHT sounding NDP, a user field may be omitted.

Figures 8A, 8B:
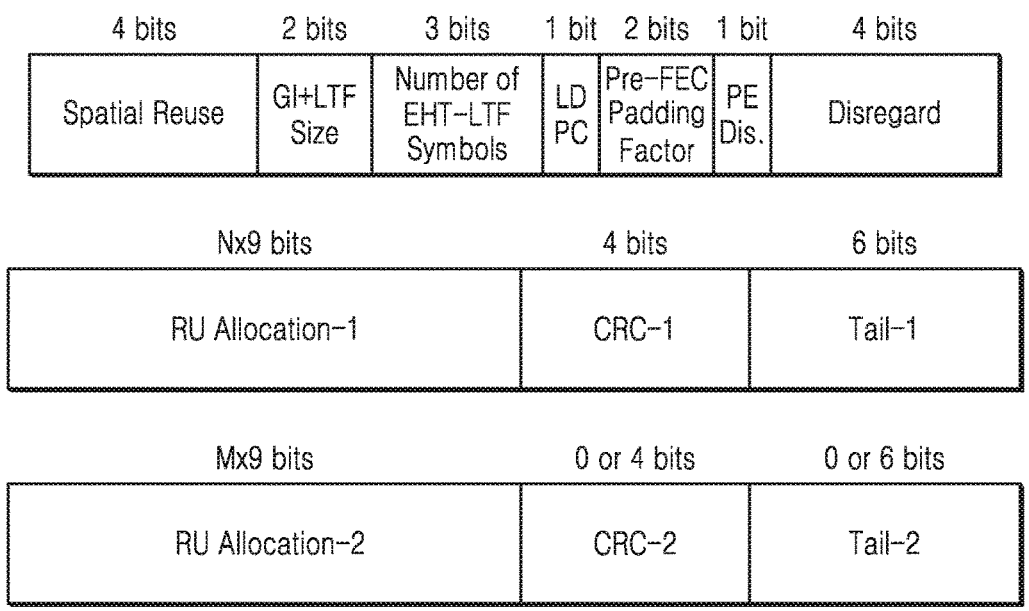

FIGS. 8A to 8C are diagrams of examples of common fields according to example embodiments. As described above with reference to FIG. 3, the common fields may be included in the EHT-SIG field.

Referring to FIG. 8A, in an OFDMA transmission mode, common fields of the EHT-SIG field may include a 4-bit spatial reuse subfield, a 2-bit GI+LTF size subfield, a 3-bit number of EHT-LTF symbols subfield, a 1-bit LDPC extra symbol segment subfield, a 2-bit Pre-FEC padding factor subfield, a 1-bit PE disambiguity subfield, an Nx9-bit RU allocation-1 subfield, a 4-bit CRC-1 subfield, a 6-bit tail-1 subfield, an Mx9-bit RU allocation-2 subfield, a 0 or 4-bit CRC-2 subfield, and a 0 or 6-bit tail-2 subfield.

When a value of a BW field of the U-SIG field is 0 or 1, that is, when a bandwidth is 20 MHz or 40 MHz, N may be 1 (N=1), and when the value of the BW field is 2, 3, 4, or 5, that is, when the bandwidth is 80 MHz, 160 MHz, or 320 MHz, N may be 2 (N=2). When the value of the BW field of the U-SIG field is 0, 1, or 2, that is, when the bandwidth is 20 MHz, 40 MHz, or 80 MHz, M may be 0 (M=0), and the RU allocation-2 subfield may be omitted in the common field. When the value of the BW field is 3, that is, when the bandwidth is 160 MHz, M may be 2 (M=2), and when the value of the BW field is 4 or 5, that is, when the bandwidth is 320 MHz, M may be 6 (M=6). When the RU allocation-2 subfield is omitted, the CRC-2 subfield and the tail-2 subfield may each have 0 bits and may be omitted in the common field.

Among the subfields included in the common field, the RU allocation subfield may indicate RU allocation information regarding a 20 MHz sub-channel (that is, information regarding an RU type and the number of users supported). Accordingly, as the bandwidth increases, the number of RU allocation subfields in the common field may increase, and user fields having the same number as the number of users indicated by the RU allocation sub-fields may be included in the user specific field of the content channel.

Referring to FIG. 8B, in a non-OFDMA transmission mode, the common field of the EHT-SIG field may include a 4-bit spatial reuse subfield, a 2-bit GI+LTF size subfield, a 3-bit number of EHT-LTF symbols subfield, a 1-bit LDPC extra-symbol segment subfield, a 2-bit Pre-FEC padding factor subfield, a 1-bit PE disambiguity subfield, and a 4-bit number of a non-OFDMA user's subfield. In the non-OFDMA transmission mode, the user specific field of the content channel may include user fields of which the number is indicated by a value of the number of a non-OFDMA user's subfield.

Referring to FIG. 8C, in the EHT sounding NDP mode, the common field of the EHT-SIG field may include the 4-bit spatial reuse subfield, the 2-bit GI+LTF size subfield, the 3-bit number of EHT-LTF symbols subfield, a 4-bit number of spatial streams (NSS) subfield, the 1-bit beamformed (BF) subfield, a 4-bit CRC subfield, and a 6-bit tail subfield. The value of the NSS subfield may indicate the number of spatial streams, for example, a maximum of eight spatial streams.

Figure 9B:
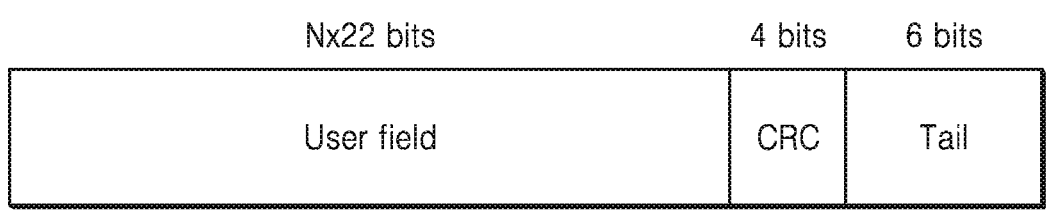

FIGS. 9A and 9B are diagrams of examples of a block including a user field, according to example embodiments. In detail, FIG. 9A illustrates an encoding block including a common field and a user field, and FIG. 9B illustrates a user block field.

The user specific field may include 0 or at least one user block field and may have different features depending on different modes. For example, in an OFMDA transmission mode, each non-final user block may include two user fields including information for two stations used to decode payloads. Also, in the OFMDA transmission mode, a final user block field may include information for one user or two users which is dependent on the number of users in the EHT-SIG content channel, and the number of user fields may be presented by the RU allocation subfields. In the non-OFDMA transmission mode, the user block field may be configured in the same way as the OFDMA transmission by using other user fields than the first user field. Also, in the non-OFDMA transmission mode, the first user field may form an encoding block together with the common field, and the number of user fields may be presented in the number of a non-OFDMA user's subfield. The EHT sounding NDP may not include a user field.

Referring to FIG. 9A, the common field and the user field may be included in one encoding block. For example, as described above with reference to FIGS. 7D and 7E, in the PPDU for the DL non-OFDMA transmission to multiple users or the non-OFDMA transmission to a single user, the common field and the first user field may be included in one block, that is, the first encoding block. As illustrated in FIG. 9A, the encoding block may include a 20-bit common field, a 22-bit user field, a 4-bit CRC field, and a 6-bit tail field.

Referring to FIG. 9B, the user block field may include an Nx22-bit user field, a 4-bit CRC field, and a 6-bit tail field. In FIG. 9B, N may correspond to the number of user fields. For example, when there is only one user in the final user block field, N may be 1 (i.e., N=1), but in other cases, N may be 2 (i.e., N=2).

FIGS. 10A and 10B are diagrams of examples of a user field according to example embodiments. In detail, FIG. 10A illustrates a user field in non-MU-MIMO allocation, and FIG. 10B illustrates a user field in MU-MIMO allocation.

Referring to FIG. 10A, in the non-MU-MIMO allocation, the user field may have a 22-bit length. As illustrated in FIG. 10A, in the non-MU-MIMO allocation, the user field may include an 11-bit STA-ID subfield, a 4-bit MCS subfield, a 4-bit Number of Space-Time Streams (NSTS) subfield, a 1-bit beamformed subfield, and a 1-bit coding (C) subfield.

Referring to FIG. 10B, in the MU-MIMO allocation, the user field may have a 22-bit length. As illustrated in FIG. 10B, in the MU-MIMO allocation, the user field may include an 11-bit STA-ID subfield, a 4-bit MCS subfield, a 1-bit coding subfield, and a 6-bit spatial configuration subfield.

Figure 11A:
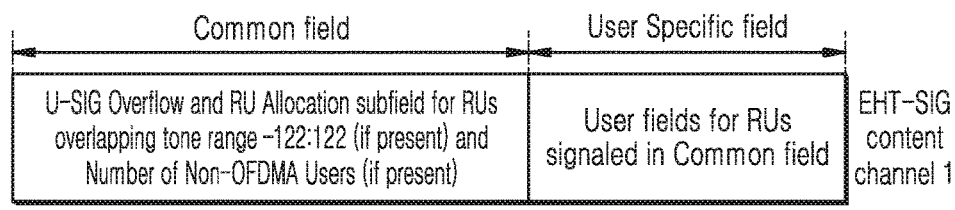
FIGS. 11A to 11D are diagrams of examples of an EHT-SIG content channel for transmission to multiple users, according to example embodiments.
Figure 11B:
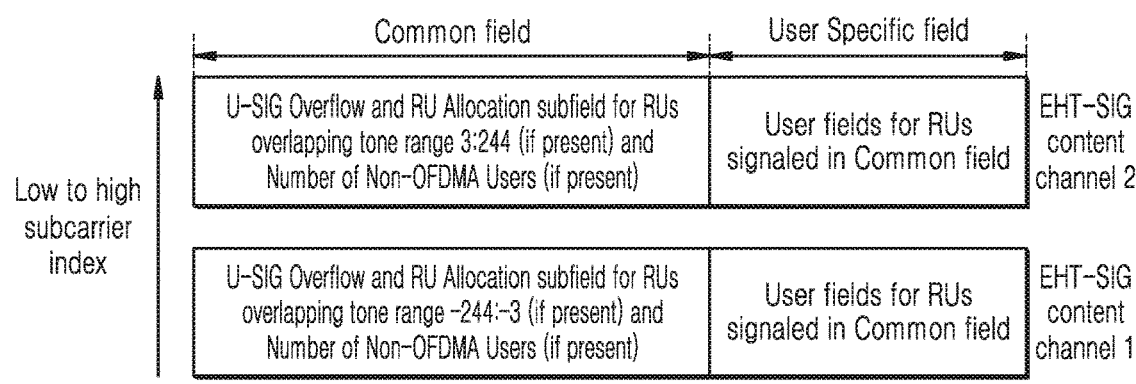
Figure 11C:
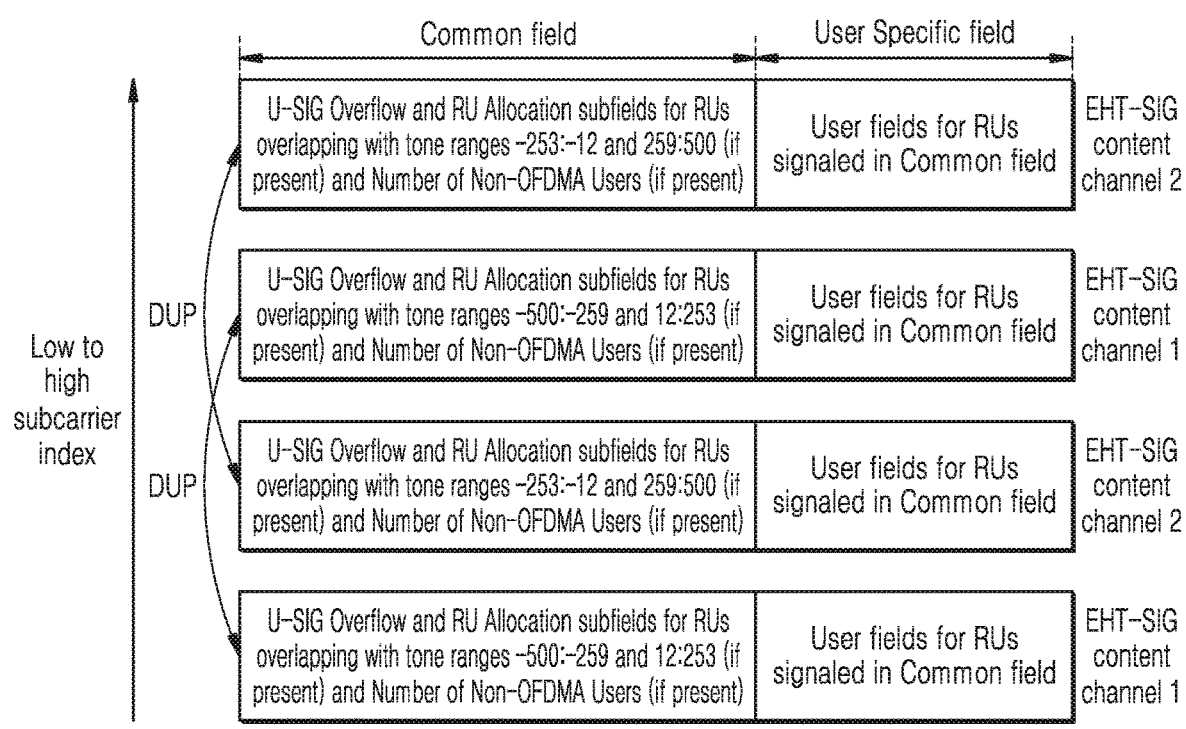
Figure 11D:
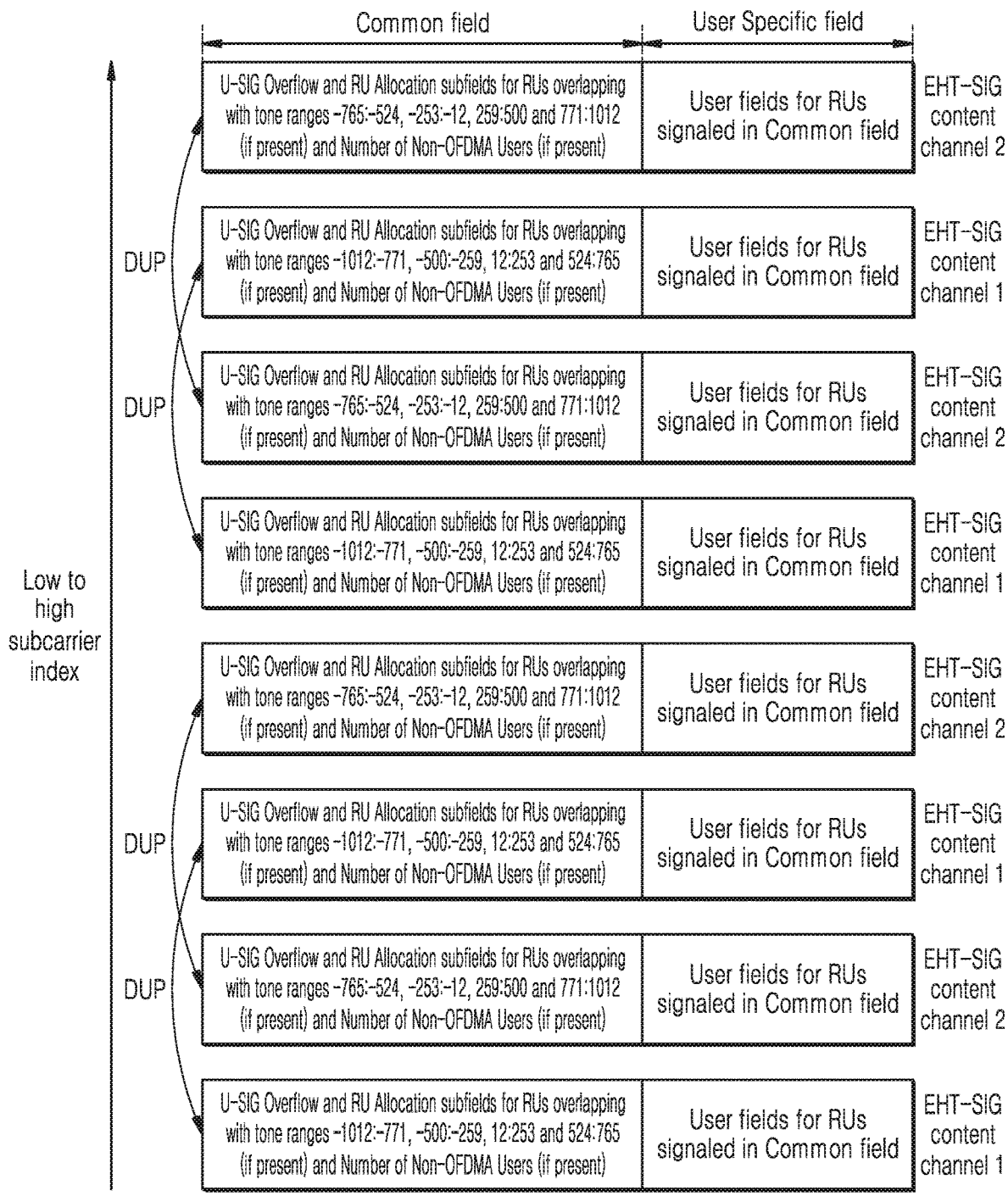

FIGS. 11A to 11D are diagrams of examples of an EHT-SIG content channel for transmission to multiple users, according to example embodiments. In detail, FIG. 11A illustrates an EHT-SIG content channel for a 20 MHz PPDU for OFDMA transmission and non-OFDMA transmission to multiple users. FIG. 11B illustrates an EHT-SIG content channel for a 40 MHz PPDU for the OFDMA transmission and the non-OFDMA transmission to multiple users. FIG. 11C illustrates an EHT-SIG content channel for an 80 MHz PPDU for the OFDMA transmission and the non-OFDMA transmission to multiple users. FIG. 11D illustrates an EHT-SIG content channel for a 160 MHz PPDU for the OFDMA transmission and the non-OFDMA transmission to multiple users.

Referring to FIGS. 11A to 11D, in the OFDMA transmission mode or the non-OFDMA transmission mode for multiple users, the EHT-SIG content channel may have a duplicated structure in a frequency domain. For example, in the OFDMA transmission mode, the EHT-SIG content channel may have a different piece of information in every 80 MHz frequency subblock. In the non-OFDMA transmission mode for multiple users, the EHT-SIG content channel may have a different piece of information in every 80 MHz frequency subblock.

Figure 12A:
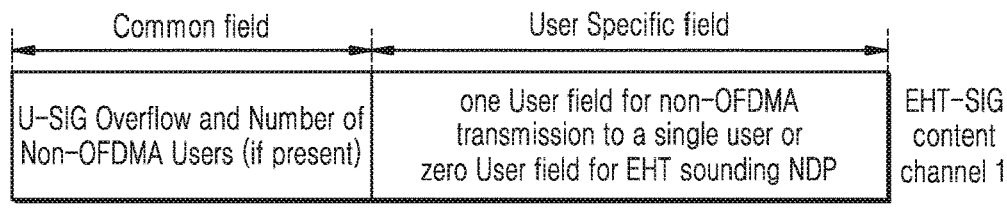
FIGS. 12A to 12D are diagrams of examples of an EHT-SIG content channel for transmission to a single user or a sounding Null Data Packet (NDP), according to example embodiments.
Figure 12B:
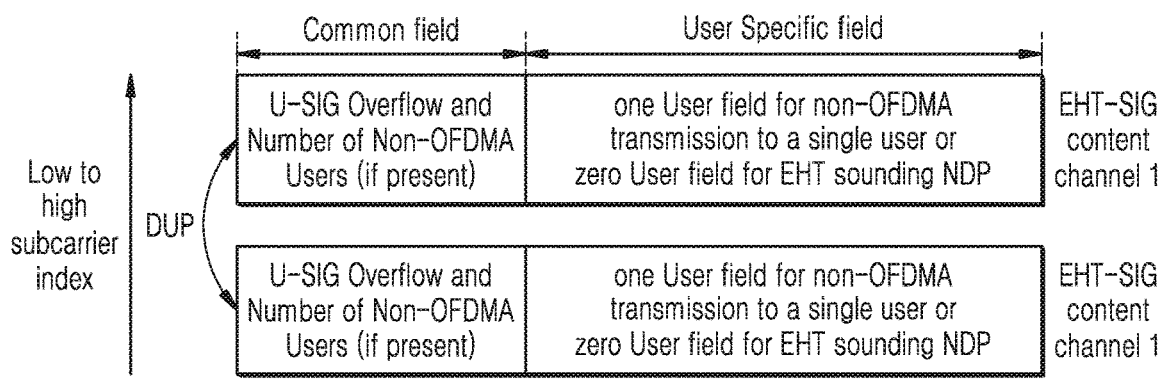
Figure 12C:
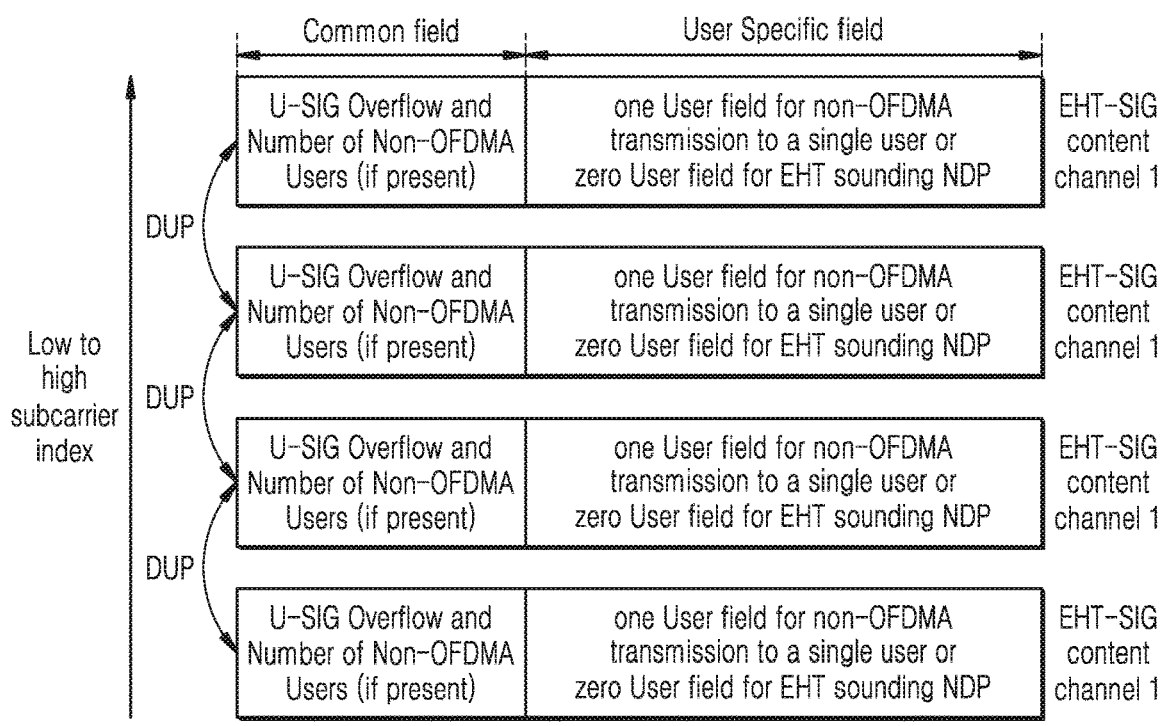
Figure 12D:
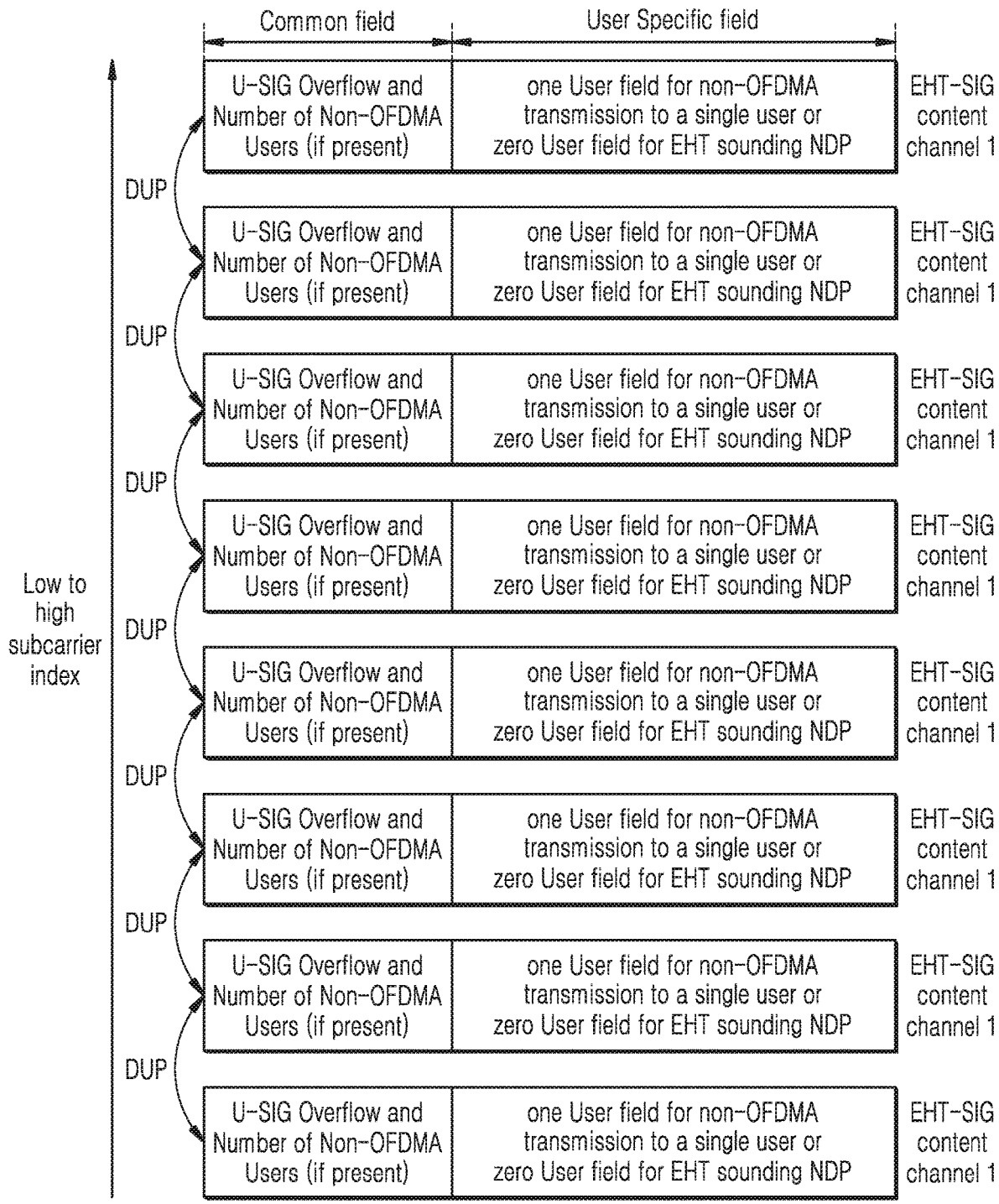

FIGS. 12A to 12D are diagrams of examples of an EHT-SIG content channel for transmission to a single user or a sounding NDP, according to example embodiments. In detail, FIG. 12A illustrates an EHT-SIG content channel for a 20 MHz PPDU for the non-OFDMA transmission to a single user or the EHT sounding NDP. FIG. 12B illustrates an EHT-SIG content channel for a 40 MHz PPDU for the non-OFDMA transmission to a single user or the EHT sounding NDP. FIG. 12C illustrates an EHT-SIG content channel for an 80 MHz PPDU for the non-OFDMA transmission to a single user or the EHT sounding NDP. FIG. 12D illustrates an EHT-SIG content channel for a 160 MHz PPDU for the non-OFDMA transmission to a single user or the EHT sounding NDP.

Referring to FIGS. 12A to 12D, in the non-OFDMA transmission mode for a single user, the EHT-SIG content channel may have the same information in every 80 MHz frequency subblock. Also, in the non-OFDMA transmission mode for a single user or an EHT sounding NDP mode, one EHT-SIG content channel may be duplicated in every 20 MHz frequency subblock, regardless of bandwidths.

Figure 13:
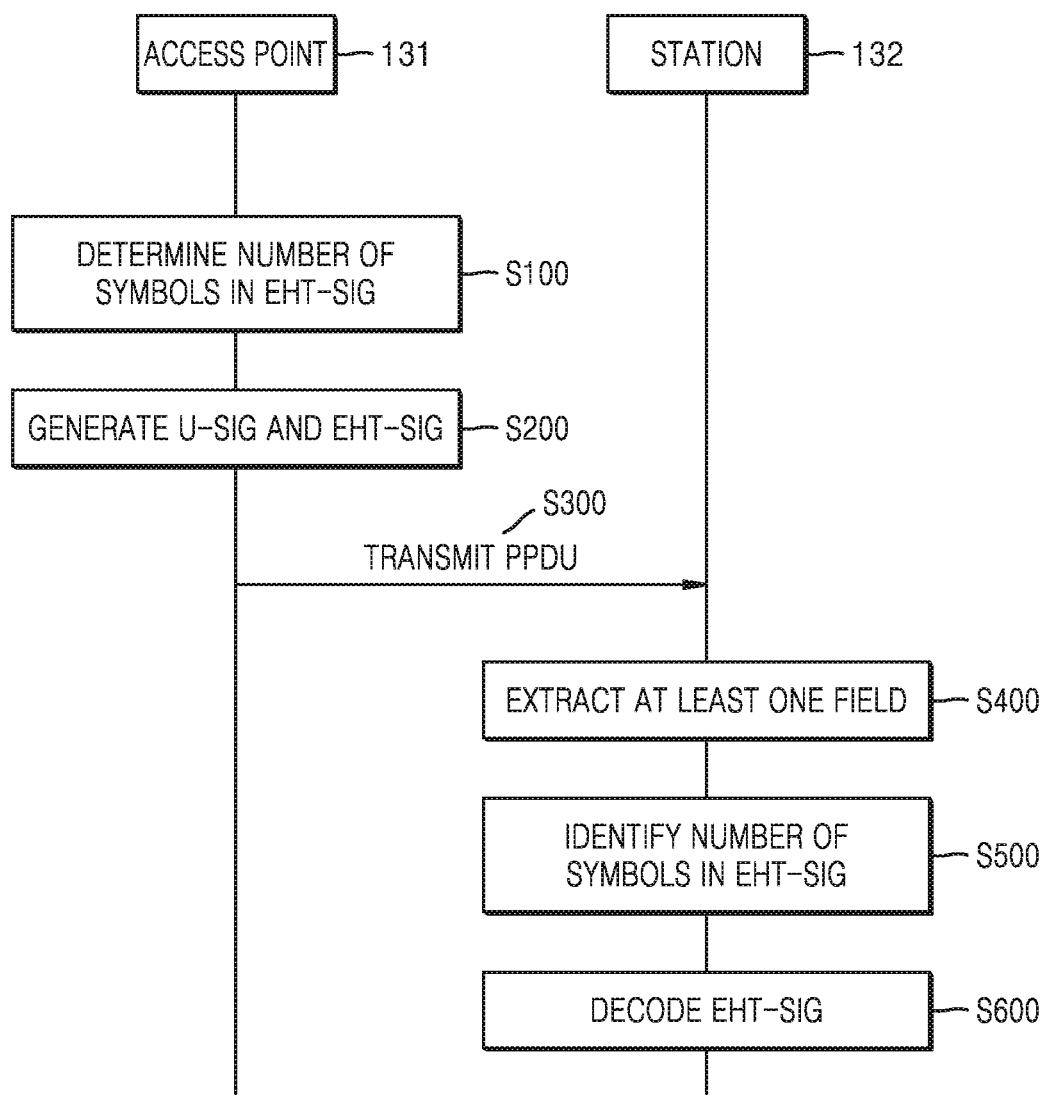
FIG. 13 is a message diagram of a method for an extended signal field, according to an example embodiment.

FIG. 13 is a message diagram of a method for an extended signal field, according to an example embodiment. As illustrated in FIG. 13, the method for an extended signal field may include operations S100 to S600.

Referring to FIG. 13, in operation S100, an access point 131 may determine the number of symbols in the EHT-SIG field. The EHT-SIG field may have the structure described above with reference to the attached drawings. The number of OFDM symbols for the EHT-SIG field may vary according to a mode, for example, a DL OFDMA transmission, a DL non-OFDMA transmission to multiple users, a non-OFDMA transmission to a single user, or an EHT sounding NDP. Also, in the DL OFDMA transmission and the DL non-OFDMA transmission to multiple users, the EHT-SIG field may include several or several tens of OFDM symbols according to the number of user fields included in a user specific field. Accordingly, the access point 131 may determine the number of symbols included in the EHT-SIG field based on the description above. In some examples, the determined number of symbols may be greater than a threshold number, for example, 32.

In operation 200, the access point 131 may generate the U-SIG field and the EHT-SIG field. For example, as described above with reference to FIG. 4, the access point 131 may generate the U-SIG field including the EHT-SIG symbol number field in the U-SIG 2. Also, the access point 131 may generate the EHT-SIG field having a structure according to a mode.

In operation S300, the access point 131 may transmit a PPDU to a station 132, and the station 132 may receive the PPDU. For example, as described above with reference to FIG. 3, the access point 131 may transmit, to the station 132, the EHT MU PPDU including the U-SIG field and the EHT-SIG field.

In operation S400, the station 132 may extract at least one field from the PPDU. For example, the station 132 may extract the U-SIG field from the PPDU received in operation S300 and may extract the EHT-SIG symbol number field from the U-SIG field. Also, the station 132 may further extract, from the PPDU, at least one additional field to identify the number of symbols in the EHT-SIG field included in the PPDU.

In operation S500, the station 132 may identify the number of symbols in the EHT-SIG field. For example, the station 132 may identify the number of symbols in the EHT-SIG field, based on a value of the at least one field extracted in operation S400. In some embodiments, the station 132 may identify a number of symbols that is greater than 32. Examples of operation S500 will be described below with reference to FIGS. 14, 16, and 19.

In operation S600, the station 132 may decode the EHT-SIG field. For example, the station 132 may decode the EHT-SIG field based on the number of symbols in the EHT-SIG field which is identified in operation S500. Even when the EHT-SIG field corresponds to a number of symbols that is greater than 32, the number of symbols may be accurately identified in operation S500. Accordingly, the station 132 may accurately decode the EHT-SIG field early.

Figure 14:
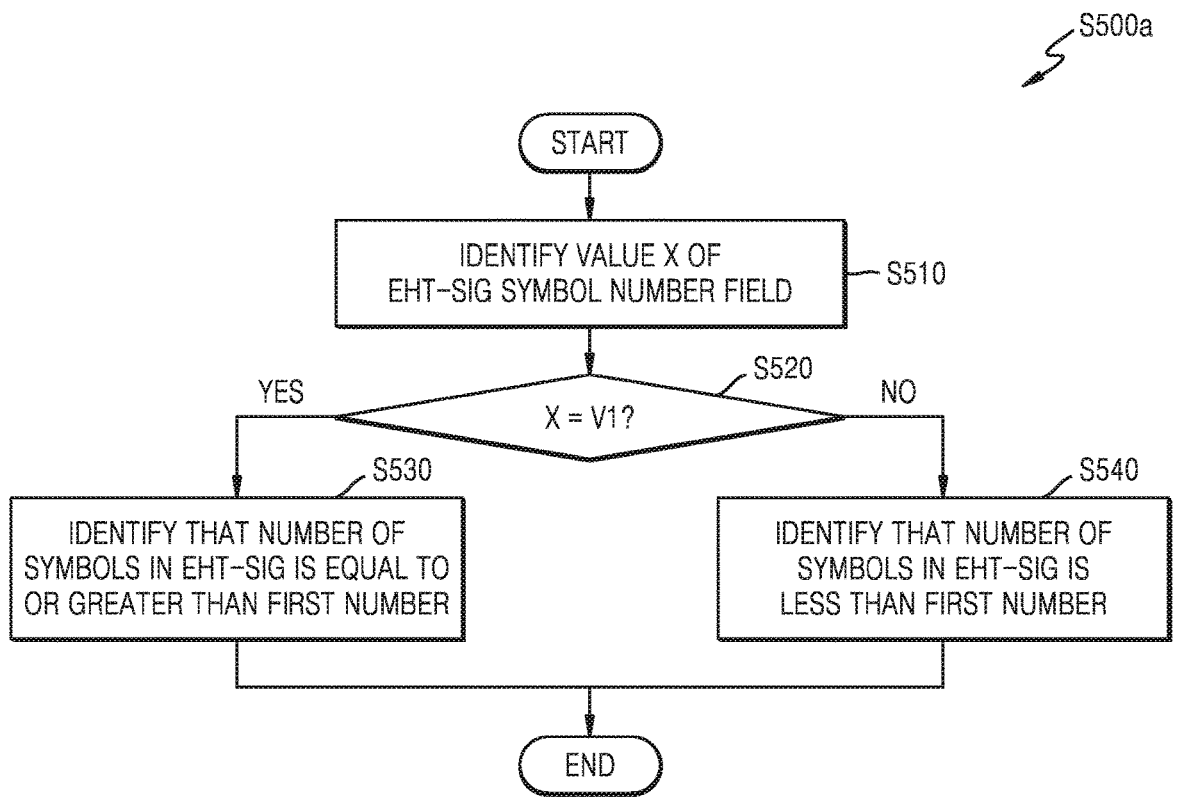
FIG. 14 is a flowchart of a method for an extended signal field, according to an example embodiment.

FIG. 14 is a flowchart of a method for an extended signal field, according to an example embodiment. In detail, the flowchart of FIG. 14 illustrates an example of operation S500 of FIG. 13. As illustrated in FIG. 14, operation S500a may include operations S510 to S540. As described above with reference to FIG. 13, the number of symbols in the EHT-SIG field may be identified in operation S500a of FIG. 14. In some embodiments, operation S500a of FIG. 14 may be performed by the station 132 of FIG. 13, and hereinafter, FIG. 14 will be described with reference to FIG. 13.

Referring to FIG. 14, in operation S510, a value of the EHT-SIG symbol number field, X, may be identified. For example, in operation S400 of FIG. 13, the EHT-SIG symbol number field may be extracted, and the value of the EHT-SIG symbol number field, X, may be identified. As described above with reference to FIG. 4, when the EHT-SIG symbol number field has 5 bits, the value of the EHT-SIG symbol number field, X, may be one of 0 to 31.

In operation S520, the value of the EHT-SIG symbol number field, X, may be compared with a first value V1. In some embodiments, the first value V1 may be a maximum value of X that is the value of the EHT-SIG symbol number field. For example, as described above with reference to FIG. 4, when the EHT-SIG symbol number field has 5 bits, the first value V1 may be 31. As illustrated in FIG. 14, when the value of the EHT-SIG symbol number field, X, is equal to the first value V1, operation S530 may be performed. On the other hand, when the value of the EHT-SIG symbol number field, X, is not equal to the first value V1, operation S540 may be performed.

When the value of the EHT-SIG symbol number field, X, is equal to the first value V1, it may be identified in operation S530 that the number of symbols in the EHT-SIG field is equal to or greater than a first number. In some embodiments, the first number may be a number indicated by the first value V1. For example, when the EHT-SIG symbol number field has 5 bits, the first value V1 may be 31, and the first number may be 32. Accordingly, it may be identified that the number of symbols in the EHT-SIG field is equal to or greater than 32. The example of operation S530 will be described below with reference to FIG. 15.

When the value of the EHT-SIG symbol number field, X, is not equal to the first value V1, the number of symbols in the EHT-SIG field, which is less than the first number, may be identified in operation S540. In some embodiments, the first number may be a number indicated by the first value V1. For example, when the EHT-SIG symbol number field has 5 bits, the first value V1 may be 31, and the first number may be 32. Accordingly, it may be identified that the number of symbols in the EHT-SIG field is one of 1 to 31 according to the value of the EHT-SIG symbol number field, X, which is one of 0 to 30.

Figure 15:
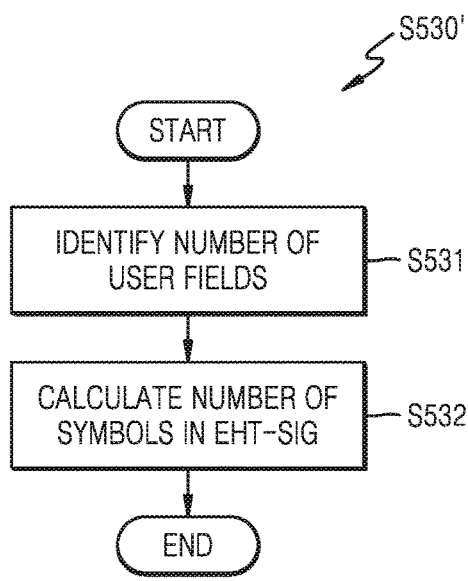
FIG. 15 is a flowchart of a method for an extended signal field, according to an example embodiment.

FIG. 15 is a flowchart of a method for an extended signal field, according to an example embodiment. In detail, the flowchart of FIG. 15 illustrates the example of operation S530 of FIG. 14. As illustrated in FIG. 15, operation S530' may include operations S531 and S532. As illustrated above with reference to FIG. 14, when the value of the EHT-SIG symbol number field, X, is equal to the first value V1, it may be identified in operation S530' that the number of symbols in the EHT-SIG field is equal to or greater than the first number. In some embodiments, operation S530' of FIG. 15 may be performed by the station 132 of FIG. 13, and hereinafter, the flowchart of FIG. 15 will be described with reference to FIGS. 13 and 14.

Referring to FIG. 15, the number of user fields may be identified in operation S531. When the value of the EHT-SIG symbol number field, X, is equal to the first value V1, the station 132 may identify the number of user fields in the EHT-SIG content channel that is defined by the EHT-SIG common field.

In operation S532, the number of symbols in the EHT-SIG field may be calculated. For example, the station 132 may calculate the number of OFDM symbols in the EHT-SIG field, based on the number of symbols identified in operation S531. Accordingly, the EHT-SIG symbol number field included in the U-SIG field may be defined as shown in Table 1 below.

TABLE 1

| Bit | Field | Number of bits | Description |
|---|---|---|---|
| B11-B15 | Number Of EHT-SIG Symbols | 5 | Indicates the number of OFDM symbols in the EHT-SIG field:<br>Set to the number of OFDM symbols in the EHT-SIG field minus 1 if the number of OFDM symbols in the EHT-SIG field is less than 32;<br>Set to 31 to indicate that the number of OFDM symbols in the EHT-SIG field is greater than or equal to 32. The exact number of OFDM symbols in the EHT-SIG is calculated based on the number of User fields in the EHT-SIG content channel, which is indicated by EHT-SIG Common field in this case. |

Figure 16:
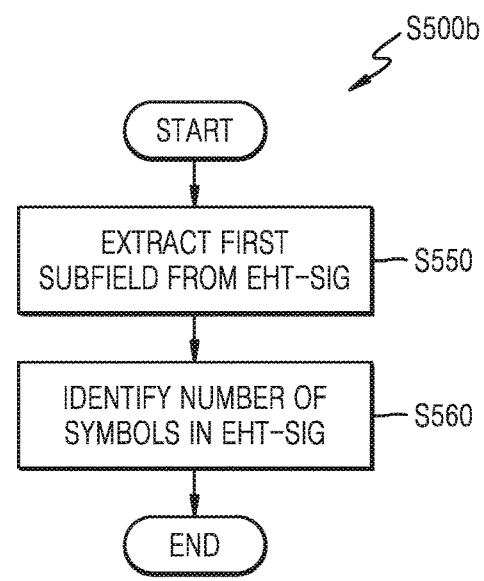
FIG. 16 is a flowchart of a method for an extended signal field, according to an example embodiment.

FIG. 16 is a flowchart of a method for an extended signal field, according to an example embodiment. In detail, the flowchart of FIG. 16 illustrates an example of operation S500 of FIG. 13. As illustrated in FIG. 16, operation S500b may include operations S550 and S560. As described above with reference to FIG. 13, in operation S500b of FIG. 16, the number of symbols in the EHT-SIG field may be identified. In some embodiments, operation S500b of FIG. 16 may be performed by the station 132 of FIG. 13, and hereinafter, the flowchart of FIG. 16 will be described with reference to FIG. 13.

Referring to FIG. 16, in operation S550, a first subfield may be extracted from the EHT-SIG field. In some embodiments, the EHT-SIG field may include an additional field for indicating the number of symbols that is greater than the maximum number that may be indicated by the EHT-SIG symbol number field. The additional field included in the EHT-SIG field may include at least one bit, and herein, the additional field may be referred to as an EHT-SIG symbol number extension field. Examples of the EHT-SIG symbol number extension field will be described below with reference to FIGS. 17A and 17B.

In operation S560, the number of symbols in the EHT-SIG field may be identified. For example, the station 132 may identify the number of symbols in the EHT-SIG field based on the EHT-SIG symbol number field extracted from the U-SIG field and the first subfield extracted in operation S550 from the EHT-SIG field. In some embodiments, as described below with reference to FIG. 18, the station 132 may concatenate bits of the EHT-SIG symbol number field to at least one bit of the first subfield extracted from the EHT-SIG field, and the number of symbols in the EHT-SIG field may be identified from the concatenated bits. For example, when the concatenated bits are 6 bits, the number of symbols in the EHT-SIG field (e.g., up to a maximum of 64) may be identified.

Figure 17A:
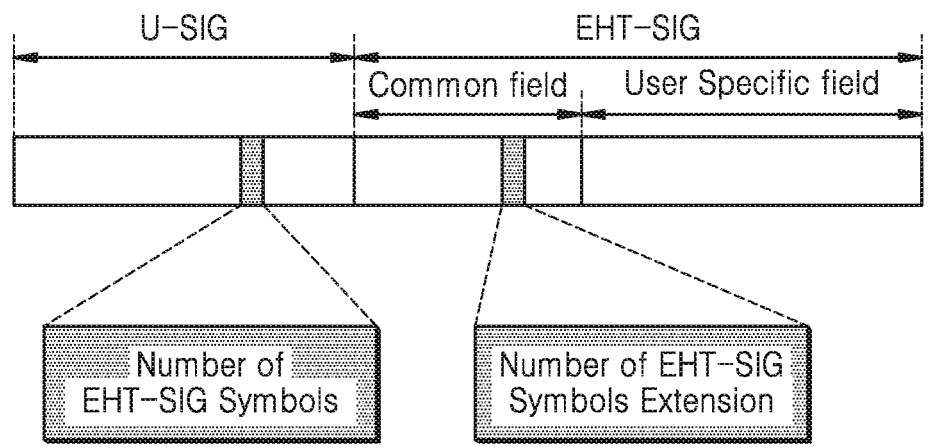
FIGS. 17A and 17B are diagrams of examples of a U-SIG field and an EHT-SIG field, according to example embodiments.
Figure 17B:
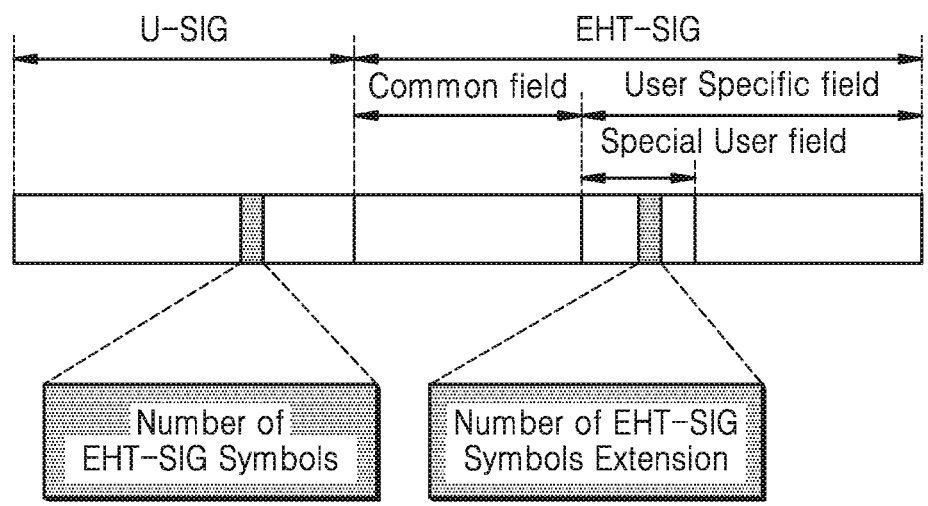

FIGS. 17A and 17B are diagrams of examples of a U-SIG field and an EHT-SIG field, according to example embodiments. In detail, FIGS. 17A and 17B illustrate examples of the EHT-SIG field including an EHT-SIG symbol number extension field. As described above with reference to FIG. 16, the EHT-SIG field may include an additional field. That is, the EHT-SIG field may include an EHT-SIG symbol number extension field for indicating the number of symbols that is greater than the maximum number indicated by the EHT-SIG symbol number field. The EHT-SIG symbol number extension field may include at least one bit.

Referring to FIG. 17A, in some embodiments, the EHT-SIG symbol number extension field may be included in a common field of the EHT-SIG field. As illustrated in FIG. 17A, the EHT-SIG field may include the common field and the user specific field, and the common field may include the EHT-SIG symbol number extension field. The number of symbols in the EHT-SIG field may be identified based on the EHT-SIG symbol number field included in the U-SIG field and the EHT-SIG symbol number extension field included in the common field of the EHT-SIG field, and the identified number may be greater than the first number (e.g., 32).

Referring to FIG. 17B, in some embodiments, the EHT-SIG symbol number extension field may be included in the user specific field of the EHT-SIG field. As illustrated in FIG. 17B, the EHT-SIG field may include a common field and a user specific field, and the user specific field may include a special user field. In some embodiments, the special user field may be fixed at the beginning of the user specific field and may include the EHT-SIG symbol number extension field. The number of symbols in the EHT-SIG field may be identified based on the EHT-SIG symbol number field included in the U-SIG field and the EHT-SIG symbol number extension field included in the user specific field of the EHT-SIG field. In some examples, the identified number may be greater than the first number (e.g., 32).

FIG. 18 shows encoding of an EHT-SIG symbol number field and an EHT-SIG symbol number extension field, according to an example embodiment. In detail, the table of FIG. 18 shows encoding of a 5-bit EHT-SIG symbol number field and an n-bit EHT-SIG symbol number extension field (where, n is an integer greater than 0).

In some embodiments, bits of the EHT-SIG symbol number field may be concatenated to at least one of the EHT-SIG symbol number extension fields, and the number of symbols in the EHT-SIG field may be identified based on the concatenated bits. For example, as shown in FIG. 18, n bits of the EHT-SIG symbol number extension field may be concatenated to a 5-bit Most Significant Bit (MSB) in the EHT-SIG symbol number field, and the number of symbols in the EHT-SIG field, which corresponds to the value of the concatenated bits, may be identified. In the example of FIG. 18, the number of symbols in the EHT-SIG field may be calculated by adding 1 to a value of n+5 bits. As shown in FIG. 18, the number of symbols in the EHT-SIG field, which is greater than 32, may be encoded as n bits are added.

Figure 19:
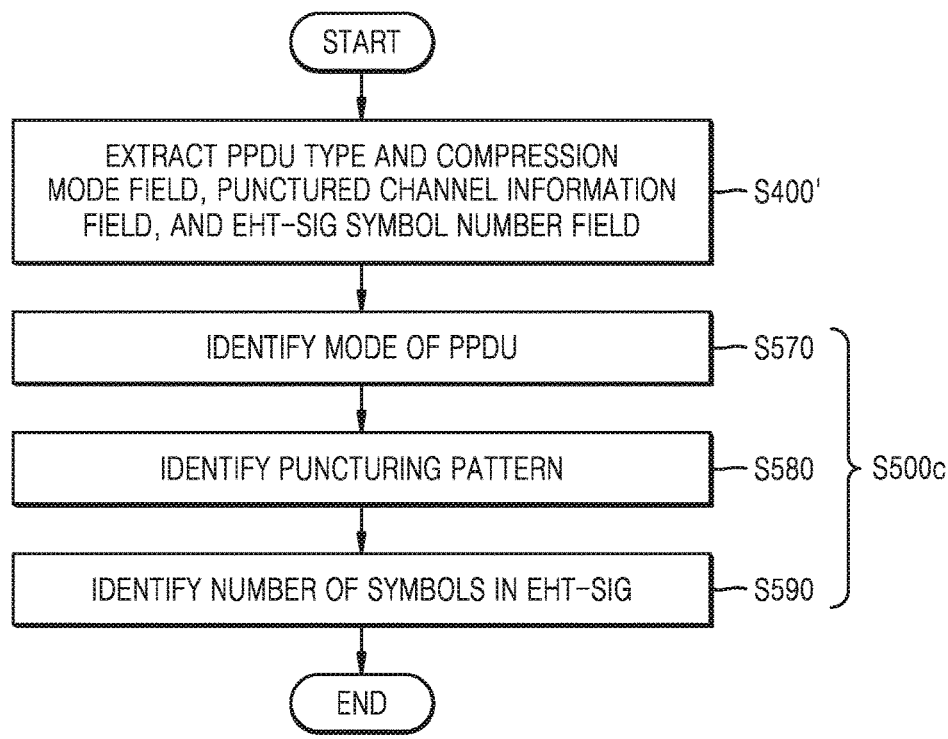
FIG. 19 is a flowchart of a method for an extended signal field, according to an example embodiment.

FIG. 19 is a flowchart of a method for an extended signal field, according to an example embodiment. In detail, the flowchart of FIG. 19 illustrates examples of operations S400 and S500 of FIG. 13. As illustrated in FIG. 19, operation S500c may be performed after operation S400', and operation S500c may include operations S570 to S590. As described above with reference to FIG. 19, at least one field may be extracted in operation S400' of FIG. 19, and the number of symbols in the EHT-SIG field may be identified in operation S500c. In some embodiments, operations S400' and S500c of FIG. 19 may be performed by the station 132 of FIG. 13, and the flowchart of FIG. 19 will be described with reference to FIG. 13.

Referring to FIG. 19, in operation S400', the PPDU type and compression mode field, the punctured channel information field, and the EHT-SIG symbol number field may be extracted from the U-SIG field. As described above with reference to FIG. 4, the PPDU type and compression mode field, the punctured channel information field, and the EHT-SIG symbol number field may be included in the U-SIG-2 of the U-SIG field, and the station 132 may extract the fields included in the U-SIG-2.

In operation S570, a compressed mode of the PPDU may be identified. For example, the station 132 may identify a mode corresponding to the value of the PPDU type and compression mode field extracted in operation S400' by referring to the table of FIG. 5.

In operation S580, the puncturing pattern may be identified. As described above with reference to FIG. 6, the punctured channel information field may be encoded differently in an OFDMA transmission and a non-OFDMA transmission. Accordingly, the station 132 may identify the puncturing pattern based on the mode identified in operation S570 and the punctured channel information field extracted in operation S400'. The example of operation S580 will be described below with reference to FIG. 20.

In operation S590, the number of symbols in the EHT-SIG field may be identified according to the identified mode. The number of symbols in the EHT-SIG field may be greater than 32 in an OFDMA transmission, but may not be greater than 32 in a non-OFDMA transmission. Accordingly, the number of symbols in the EHT-SIG field may be differently identified according to the mode, and the example of operation S590 will be described below with reference to FIG. 21.

Figure 20:
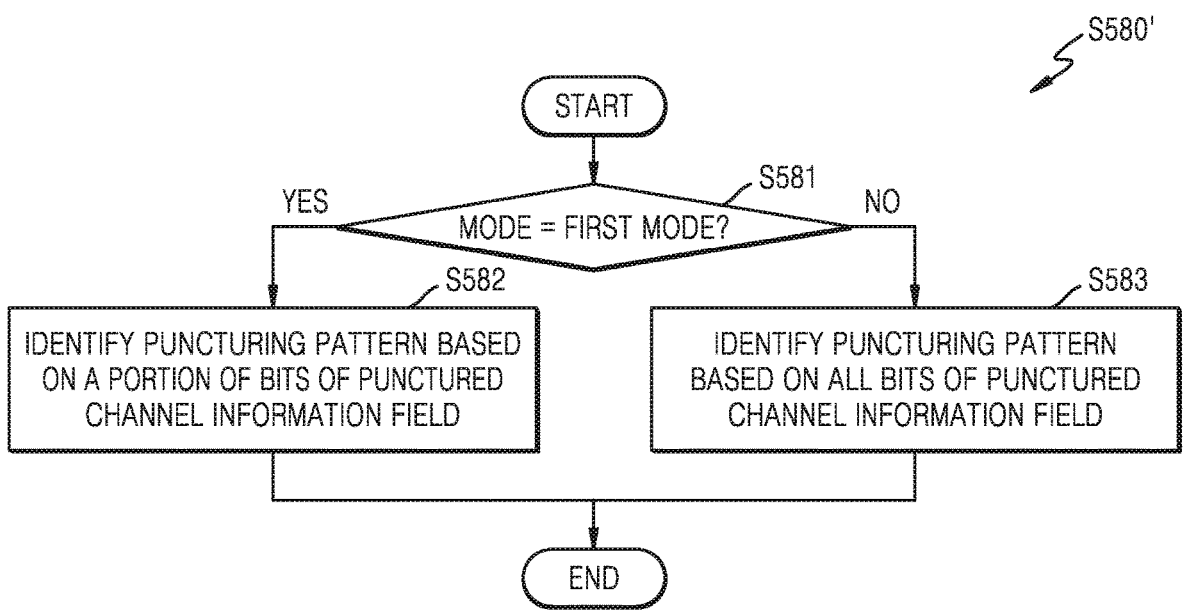
FIG. 20 is a flowchart of a method for an extended signal field, according to an example embodiment.

FIG. 20 is a flowchart of a method for an extended signal field, according to an example embodiment. In detail, the flowchart of FIG. 20 illustrates the example of operation S580 of FIG. 19. As described above with reference to FIG. 19, in operation S580' of FIG. 20, the puncturing pattern may be identified. As illustrated in FIG. 20, operation S580' may include operations S581 to S583. In some embodiments, operation S580' of FIG. 20 may be performed by the station 132 of FIG. 13, and the flowchart of FIG. 20 will be described with reference to FIG. 13.

Referring to FIG. 20, in operation S581, a determination may be made as to whether the mode is a first mode. For example, the station 132 may determine whether the mode identified in operation S570 of FIG. 19 is the first mode. In one example, the first mode is an OFDMA transmission mode. As illustrated in FIG. 20, when the identified mode is the first mode, operation S582 may be performed, but when the identified mode is not the first mode, operation S583 may be performed.

When the identified mode is the first mode, the puncturing pattern may be identified in operation S582, based on some of the bits of the punctured channel information field. For example, as described above with reference to FIG. 6, in an OFDMA transmission mode, the station 132 may identify a puncturing pattern regarding four 20 MHz frequency sub-blocks, based on 4 of 5 bits of the punctured channel information field. Accordingly, one bit of the punctured channel information field may not be used.

When the identified mode is not the first mode, the puncturing pattern may be identified according to all bits of the punctured channel information field in operation S583. For example, in a non-OFDMA transmission mode, the station 132 may identify the puncturing pattern corresponding to a 5-bit value of the punctured channel information field by referring to the table of FIG. 6.

Figure 21:
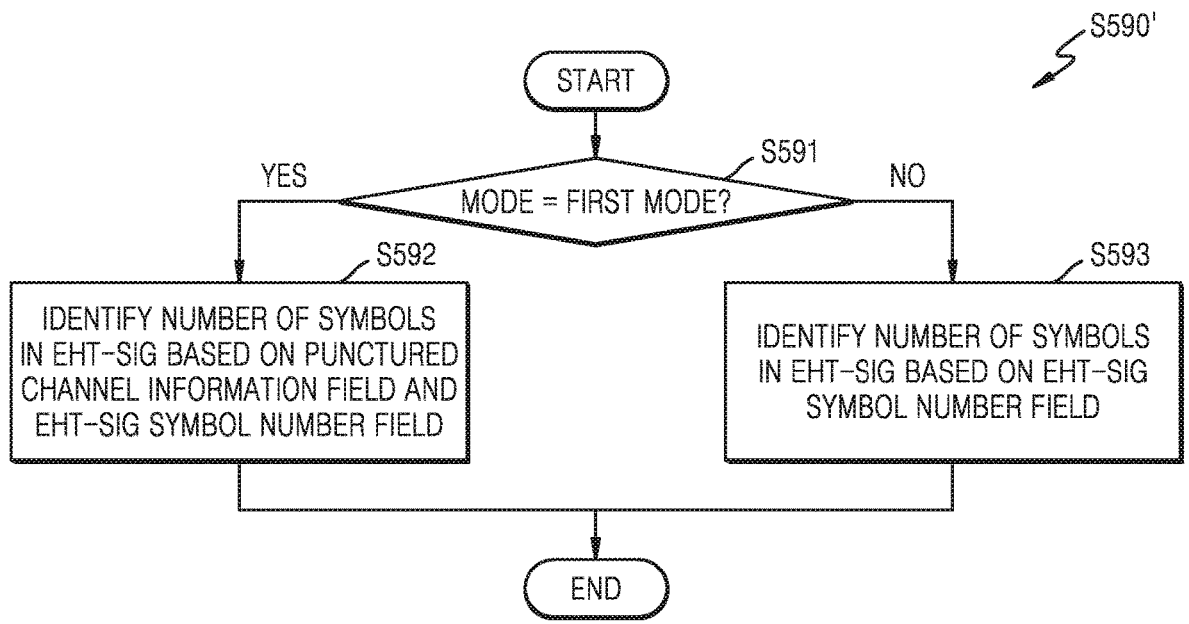
FIG. 21 is a flowchart of a method for an extended signal field, according to an example embodiment.

FIG. 21 is a flowchart of a method for an extended signal field, according to an example embodiment. In detail, the flowchart of FIG. 21 illustrates the example of operation S590 of FIG. 19. As described above with reference to FIG. 19, the number of symbols in the EHT-SIG field may be identified in operation S590' of FIG. 21. As illustrated in FIG. 21, operation S590' may include operations S591 to S593. In some embodiments, operation S590' of FIG. 21 may be performed by the station 132 of FIG. 13, and hereinafter, the flowchart of FIG. 21 will be described with reference to FIG. 13.

Referring to FIG. 21, in operation S591, a determination may be made as to whether a mode is the first mode. For example, the station 132 may determine whether the mode identified in operation S570 of FIG. 19 is the first mode, and the first mode may be the OFDMA transmission mode. As illustrated in FIG. 21, when the identified mode is the first mode, operation S592 may be performed, but when the identified mode is not the first mode, operation S593 may be performed.

When the identified mode is the first mode, the number of symbols in the EHT-SIG field may be identified in operation S592 from the punctured channel information field and the EHT-SIG symbol number field. As described above with reference to FIGS. 6 and 20, one of 5 bits of the punctured channel information field may not be used in the OFDMA transmission, and accordingly, one bit of the punctured channel information field, which is not used in an OFDMA transmission, may function as the EHT-SIG symbol number extension field. In some embodiments, the station 132 may concatenate 5 bits of the EHT-SIG symbol number field to one bit of the punctured channel information field and may identify, from the concatenated 6 bits, a number of symbols in the EHT-SIG field that is greater than 32.

When the identified mode is not the first mode, the number of symbols in the EHT-SIG field may be identified from the EHT-SIG symbol number field in operation S593. As described above with reference to FIG. 6, the number of symbols in the EHT-SIG field may not be greater than 32 in a non-OFDMA transmission mode and may be identified from the EHT-SIG symbol number field having 5 bits. Accordingly, the EHT-SIG symbol number field included in the U-SIG field may be defined as shown in Table 2 below.

TABLE 2

| Bit | Field | Number of bits | Description |
|---|---|---|---|
| B11-B15 | Number of EHT-SIG Symbols | 5 | Indicates the number of OFDM symbols in the EHT-SIG field:<br>If an OFDMA case,<br>[B7, B11-B15] of U-SIG-2 is set to the number of OFDM symbols in the EHT-SIG field minus 1; |

TABLE 2-continued

| Bit | Field | Number of bits | Description |
|---|---|---|---|
| | | | NOTE-In an OFDMA case, B7 of Punctured Channel Information field is used to indicate the number of OFDM symbols in the EHT-SIG field. If a non-OFDMA case, B11-B15 of U-SIG-2 is set to the number of OFDM symbols in the EHT-SIG field minus 1; NOTE-In a non-OFDMA case, B7 of Punctured Channel Information field is used to indicate the non-OFDMA puncturing pattern of the entire PPDU bandwidth. |

Figure 22:
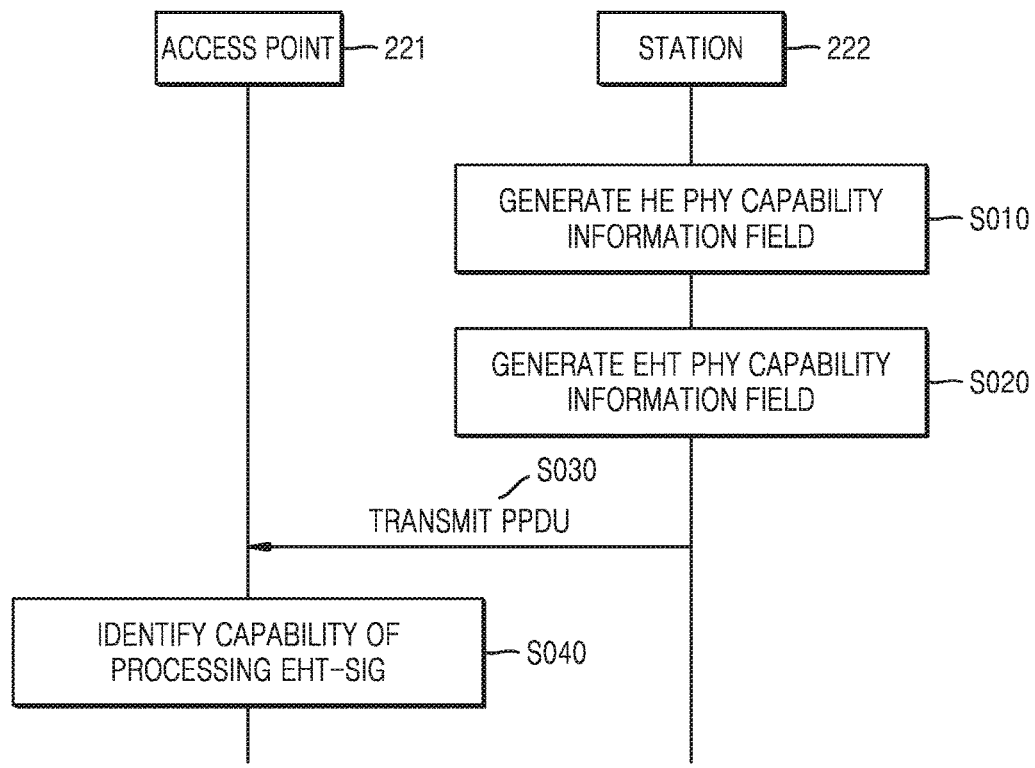
FIG. 22 is a message diagram for a method of an extended signal field, according to an example embodiment.

FIG. 22 is a message diagram of a method for an extended signal field, according to an example embodiment. As illustrated in FIG. 22, the method for an extended signal field may include operations S010 to S040.

In some embodiments, a report on whether a station 222 may process the EHT-SIG field corresponding to symbols that are greater than the first number may be transmitted to an access point 221. For example, the station 222 may provide the access point 221 with information regarding capability of the station 222 during an association process with the access point 221, and the above information may include information indicating whether the station 222 may process the EHT-SIG field corresponding to symbols that are greater than the first number.

Referring to FIG. 22, the station 222 may generate an HE physical (PHY) capability information field in operation S010 and generate an EHT PHY capability information field in operation S020. Herein, HE may be referred to as a legacy protocol, and EHT or EHT+ may be referred to as a non-legacy protocol. The HE PHY capability information may include information regarding functions that a station supporting the HE may support, and the EHT PHY capability information may include information regarding functions that a station supporting the EHT may support. In some embodiments, the station supporting only the HE (which may be referred to as a legacy apparatus or a legacy station) may provide only the HE PHY capability information field to the access point 221, and the station supporting the EHT (which may be referred to as a non-legacy apparatus or a non-legacy station) may provide the EHT PHY capability information field as well as the HE PHY capability information field to the access point 221.

In some embodiments, as described below with reference to FIGS. 23A and 23B, the information indicating whether the EHT-SIG field corresponding to the symbols, which are greater than the first number, may be processed, may be included in the HE PHY capability information field or the EHT PHY capability information field. Accordingly, the station 222 may generate, in operation S010, the HE PHY capability information field including the information that indicates whether the EHT-SIG field corresponding to the symbols that are greater than the first number may be processed, or may generate, in operation S020, the EHT PHY capability information field including the information.

In operation S030, the station 222 may transmit the PPDU, and the access point 221 may receive the PPDU. The station 222 may transmit the PPDU including the HE PHY capability information field generated in operation S010 and the EHT PHY capability information field generated in operation S020.

In operation S040, the access point 221 may identify the capability of the station 222 to process the EHT-SIG field. For example, the access point 221 may extract the HE PHY capability information field and/or the EHT PHY capability information field from the PPDU received in operation S030 and may identify whether the station 222 may process the EHT-SIG field corresponding to the symbols that are greater than the first number, based on the information regarding the extracted fields. When it is identified that the station 222 processes the EHT-SIG field corresponding to a number of symbols that are greater than the first number, the access point 221 may generate the EHT-SIG field corresponding to a number of symbols that are greater than the first number and may generate at least one field (or at least one bit) including the EHT-SIG symbol number field to indicate the number of symbols in the EHT-SIG field.

Figure 23A:
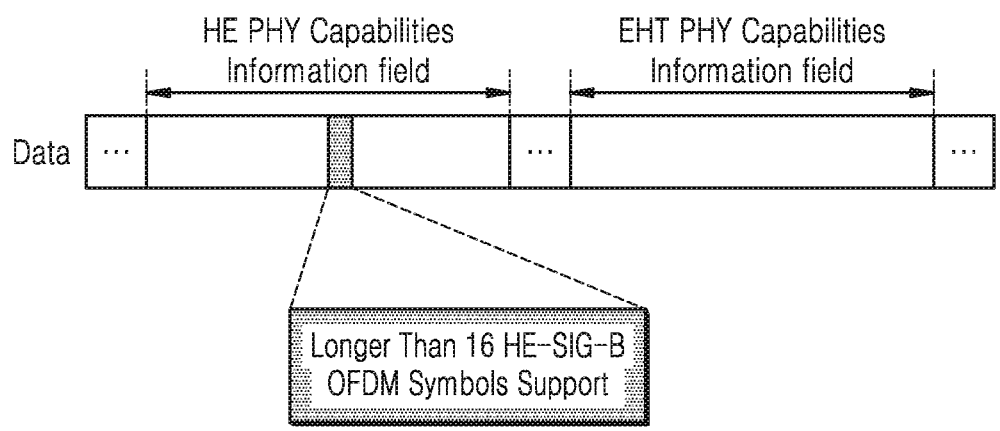
FIGS. 23A and 23B are diagrams of an HE physical (PHY) capability information field and an EHT PHY capability information field, according to example embodiments.
Figure 23B:
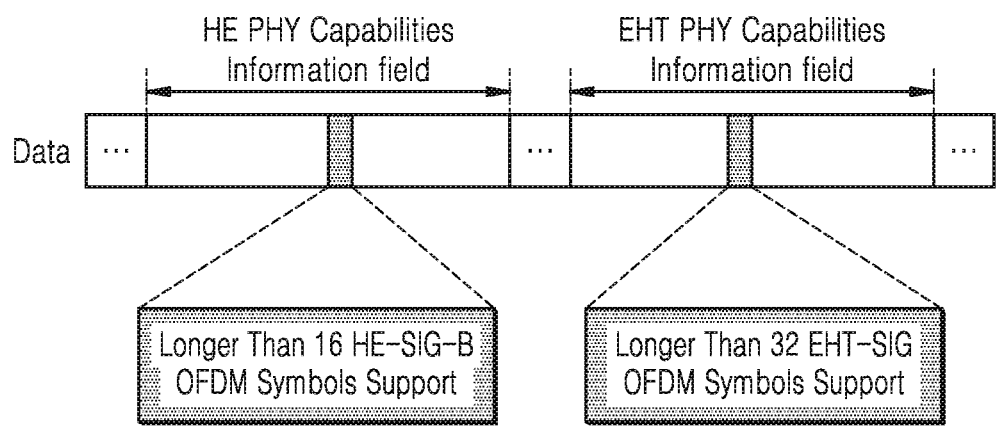

FIGS. 23A and 23B are diagrams illustrating an HE PHY capability information field and an EHT PHY capability information field, according to example embodiments. In some embodiments, the HE PHY capability information field and the EHT PHY capability information field may be included in a data field of a payload. As described above with reference to FIG. 22, the station 222 may generate the HE PHY capability information field and the EHT PHY capability information field. Hereinafter, the diagrams of FIGS. 23A and 23B will be described with reference to FIG. 22, and repeated descriptions will be omitted.

Referring to FIG. 23A, the HE PHY capability information field may include a longer-than-16 HE-SIG-B OFDM symbols support subfield. The longer-than-16 HE-SIG-B OFDM symbols support subfield may have a 1-bit length and have a value indicating whether the station may support symbols in an HE-SIG-B field that are greater than 16. For example, when a value of the longer-than-16 HE-SIG-B OFDM symbols support subfield is '1,' the access point 221 may identify that an HE station may process symbols in the HE-SIG-B field that are greater than 16. On the other hand, when a value of the longer-than-16 HE-SIG-B OFDM symbols support subfield is '0,' the access point 221 may identify that the HE station may process the symbols in the HE-SIG-B field that are less than or equal to 16.

In the example of FIG. 23A, the longer-than-16 HE-SIG-B OFDM symbols support subfield included in the HE PHY capability information field may be used to indicate whether the EHT-SIG field corresponding to the symbols, which are greater than the first number, may be processed. For example, the access point 221 may identify whether a station is an HE station or an EHT station. When an HE station is identified, the access point 221 may determine that the value of the longer-than-16 HE-SIG-B OFDM symbols support subfield indicates whether the station supports symbols in the HE-SIG-B field that are greater than 16. On the other hand, when an EHT station is identified, the access point 221 may determine that the value of the longer-than-16 HE-SIG-B OFDM symbols support subfield indicates whether the station may support the symbols in the HE-SIG-B field that are greater than the first number. Accordingly, when the first number is 32, the EHT-SIG symbol number field in the U-SIG field may be defined as shown in Table 3 below.

TABLE 3

| Bit | Field | Number of bits | Description |
|---|---|---|---|
| B11-B15 | Number of EHT-SIG Symbols | 5 | Indicates the number of OFDM symbols in the EHT-SIG field:<br>Set to the number of OFDM symbols in the EHT-SIG field minus 1 if the number of OFDM symbols in the EHT-SIG field is less than 32;<br>Set to 31 to indicate that the number of OFDM symbols in the EHT-SIG field is equal to 32 if Longer-than-16 HE-SIG-B OFDM Symbols Support subfield in the HE Capabilities element transmitted by at least one recipient STA is 0;<br>Set to 31 to indicate that the number of OFDM symbols in the EHT-SIG field is greater than or equal to 32 if the Longer-than-16 HE-SIG-B OFDM Symbols Support subfield in the HE Capabilities element transmitted by all the recipient STAs are 1. The exact number of OFDM symbols in the EHT-SIG field is calculated based on the number of User fields in the EHT-SIG content channel, which is indicated by EHT-SIG Common field in this case. |

Referring to FIG. 23B, the HE PHY capability information field may include the longer-than-16 HE-SIG-B OFDM symbols support subfield, and the EHT PHY capability information field may include a longer-than-32 EHT-SIG OFDM symbols support subfield. For example, the longer-than-32 EHT-SIG OFDM symbols support subfield may have a 1-bit length and may have a value indicating whether the station may support the symbols in the EHT-SIG field that are greater than 32. For example, when a value of the longer-than-32 EHT-SIG OFDM symbols support subfield is '1,' the access point 221 may identify that the EHT station, that is, the station 222, may process the symbols in the EHT-SIG field that are greater than 32. On the other hand, when the value of the longer-than-32 EHT-SIG OFDM symbols support subfield is '0,' the access point 221 may identify that the station 222 may process the symbols in the EHT-SIG field that are less than or equal to 32. Accordingly, the longer-than-32 EHT-SIG OFDM symbols support subfield may be defined as shown in Table 4 below, and the EHT-SIG symbol number field may be defined as shown in Table 5 below.

TABLE 4

| Subfield | Definition | Encoding |
|---|---|---|
| Longer-than-32 EHT-SIG OFDM Symbols Support | For a non-AP STA, indicates support for receiving a DL EHT MU PPDU where the number of OFDM symbols in the EHT-SIG field is greater than 32. | Set to 0 if not supported.<br>Set to 1 if supported. |

TABLE 5

| Bit | Field | Number of bits | Description |
|---|---|---|---|
| B11-B15 | Number of EHT-SIG Symbols | 5 | Indicates the number of OFDM symbols in the EHT-SIG field:<br>Set to the number of OFDM symbols in the EHT-SIG field minus 1 if the number of OFDM symbols in the EHT-SIG field is less than 32;<br>Set to 31 to indicate that the number of OFDM symbols in the EHT-SIG field is equal to 32 if Longer-than-32 EHT-SIG OFDM Symbols Support subfield in the EHT Capabilities element transmitted by at least one recipient STA is 0;<br>Set to 31 to indicate that the number of OFDM symbols in the EHT-SIG field is greater than or equal to 32 if the Longer-than-32 EHT-SIG OFDM Symbols Support subfield in the EHT Capabilities element transmitted by all the recipient STAs are 1. The exact number of OFDM symbols in the EHT-SIG field is calculated based on the number of User fields in the EHT-SIG content channel, which is indicated by EHT-SIG Common field in this case. |

Figure 24:
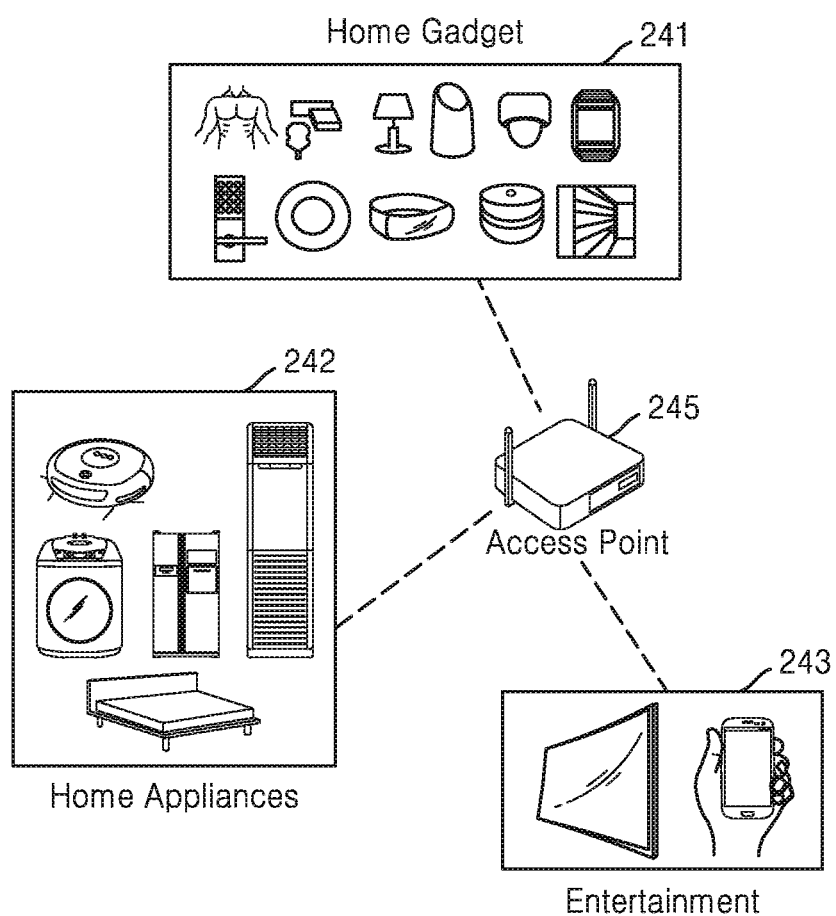
FIG. 24 is a diagram of examples of an apparatus for wireless communication, according to an example embodiment.

FIG. 24 is a diagram of examples of an apparatus for wireless communication, according to an example embodiment. In detail, FIG. 24 illustrates an Internet of Things (IoT) network system that includes a home gadget 241, home appliances 242, an entertainment device 243, and an access point 245.

In some embodiments, as described above with reference to the attached drawings, an extended signal field may be transmitted, and the number of symbols in the extended signal field may be accurately delivered in the apparatus for wireless communication illustrated in FIG. 24. Accordingly, in a WLAN system, the number of extended signal fields may be accurately identified at a receiving side, and decoding may be efficiently performed. Also, the reception and transmission of the extended signal field may be possible, and thus, the efficiency of the WLAN system may be improved.

While the inventive concepts have been particularly shown and described with reference to embodiments thereof, it will be understood that various changes in form and details may be made therein without departing from the spirit and scope of the following claims.

What is claimed is:

1. A wireless communication method by a first apparatus, the wireless communication method comprising:
   receiving a first Physical Layer Protocol Data Unit (PPDU) from a second apparatus;
   extracting a first field from a first signal field included in the first PPDU;
   extracting a common field from a second signal field included in the first PPDU; and
   identifying a number of symbols in the second signal field based on a value of the first field,
   wherein the identifying the number of symbols in the second signal field comprises identifying that the number of symbols in the second signal field is equal to or greater than a first number when the first field has a first value, and
   wherein identifying that the number of symbols in the second signal field is equal to or greater than the first number comprises:
      identifying a number of user fields in the second signal field based on a value of at least one Resource Unit (RU) allocation subfield included in the common field; and
      calculating the number of symbols in the second signal field based on the number of user fields.

2. The wireless communication method of claim 1, wherein
   the identifying the number of symbols in the second signal field further comprises:
   when the first field has a value different from the first value, identifying, from a value of the first field, the number of symbols in the second signal field that is less than the first number.

3. The wireless communication method of claim 1, further comprising
   transmitting a second PPDU comprising capability information of the first apparatus to the second apparatus,
   wherein the second PPDU comprises a first subfield, and the first subfield has a value indicating that the first apparatus is capable of processing the second signal field comprising symbols that are greater than the first number.

4. The wireless communication method of claim 3, wherein
   the second PPDU comprises a first capability information field based on a legacy protocol and a second capability information field based on a non-legacy protocol,
   the first subfield is included in the first capability information field, and
   the first subfield has a value indicating whether a legacy apparatus is capable of processing a signal field comprising a plurality of symbols, which are greater than a second number, when the first capability information field is transmitted to the second apparatus by the legacy apparatus.

5. The wireless communication method of claim 3, wherein
   the second PPDU comprises a first capability information field based on a legacy protocol and a second capability information field based on a non-legacy protocol, and
   the first subfield is included in the second capability information field.

6. The wireless communication method of claim 1, wherein
   the first field has a 5-bit length,
   the first value has binary numbers, 11111, and
   the first number is 32.

7. A wireless communication method by a first apparatus, the wireless communication method comprising:
   receiving a first Physical Layer Protocol Data Unit (PPDU) from a second apparatus;
   extracting a first field from a first signal field included in the first PPDU;
   extracting a first subfield from a second signal field included in the first PPDU; and
   identifying a number of symbols in the second signal field based on a value of the first field and a value of the first subfield, wherein the identifying the number of symbols in the second signal field comprises:
      concatenating a plurality of bits of the first field to at least one bit of the first subfield; and
      identifying the number of symbols in the second signal field based on concatenated bits.

8. The wireless communication method of claim 7, wherein
   the extracting the first subfield comprises:
   extracting a common field from the second signal field; and
   extracting the first subfield from the common field.

9. The wireless communication method of claim 7, wherein
   the extracting the first subfield comprises:
   extracting a special user field from a user specific field in the second signal field; and
   extracting the first subfield from the special user field.

10. The wireless communication method of claim 7, further comprising
   transmitting, to the second apparatus, a second PPDU comprising capability information of the first apparatus, wherein
   the second PPDU comprises a second subfield, and
   the second subfield has a value indicating that the first apparatus is capable of processing the second signal field comprising a plurality of symbols that are greater than a first number, wherein the first number is a maximum symbol number defined by the first field.

11. The wireless communication method of claim 10, wherein
the second PPDU comprises a first capability information field based on a legacy protocol and a second capability information field based on a non-legacy protocol, and
the second subfield is included in the first capability information field, and the second subfield has a value indicating whether a legacy apparatus is capable of processing a signal field comprising a plurality of symbols, which are greater than a second number, when the first capability information field is transmitted to the second apparatus by the legacy apparatus.

12. The wireless communication method of claim 10, wherein
the second PPDU comprises a first capability information field based on a legacy protocol and a second capability information field based on a non-legacy protocol, and
the second subfield is included in the second capability information field.

13. A wireless communication method by a first apparatus, the wireless communication method comprising:
receiving a first Physical Layer Protocol Data Unit (PPDU) from a second apparatus;
extracting a first field, a second field, and a third field from a first signal field included in the first PPDU;
identifying a mode of the first PPDU based on a value of the first field;
identifying a puncturing pattern based on a value of the second field; and
identifying a number of symbols in a second signal field included in the first PPDU,
wherein the identifying the number of symbols in the second signal field comprises identifying the number of symbols in the second signal field based on the third field and at least one bit of the second field when the identified mode is a first mode.

14. The wireless communication method of claim 13, wherein
the identifying the puncturing pattern comprises:
when the identified mode is the first mode, identifying the puncturing pattern based on a portion of a plurality of bits of the second field; and
when the identified mode is different from the first mode, identifying the puncturing pattern based on all of the plurality of bits of the second field.

15. The wireless communication method of claim 13, wherein
the at least one bit of the second field comprises a most significant bit (MSB) of the second field.

16. The wireless communication method of claim 13, wherein
the identifying the number of symbols in the second signal field based on the third field and the at least one bit of the second field comprises:
concatenating the at least one bit of the second field to a plurality of bits of the third field; and
identifying the number of symbols in the second signal field based on concatenated bits.

17. The wireless communication method of claim 13, further comprising
transmitting, to the second apparatus, a second PPDU comprising capability information of the first apparatus,
wherein the second PPDU comprises a subfield, and
the subfield has a value indicating that the first apparatus is capable of processing the second signal field comprising a plurality of symbols that are greater than a maximum symbol number defined by the third field.

18. The wireless communication method of claim 13, wherein,
when the identified mode is the first mode, the second signal field comprises a plurality of Orthogonal Frequency-Division Multiple Access (OFDMA) symbols.

* * * * *